US007653545B1

(12) United States Patent
Starkie

(10) Patent No.: US 7,653,545 B1
(45) Date of Patent: Jan. 26, 2010

(54) METHOD OF DEVELOPING AN INTERACTIVE SYSTEM

(75) Inventor: Bradford Craig Starkie, Surrey Hills (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 1172 days.

(21) Appl. No.: 10/009,983

(22) PCT Filed: Jun. 9, 2000

(86) PCT No.: PCT/AU00/00651

§ 371 (c)(1),
(2), (4) Date: Mar. 22, 2002

(87) PCT Pub. No.: WO00/78022

PCT Pub. Date: Dec. 21, 2000

(30) Foreign Application Priority Data

Jun. 11, 1999 (AU) .................................. PQ0917
Dec. 15, 1999 (AU) .................................. PQ4668

(51) Int. Cl.
*G10L 21/00* (2006.01)
*G10L 15/18* (2006.01)

(52) U.S. Cl. .................. 704/275; 704/257; 704/270; 704/270.1

(58) Field of Classification Search .................. None
See application file for complete search history.

(56) References Cited

U.S. PATENT DOCUMENTS 5,241,619 A    8/1993    Schwartz et al.

(Continued)

FOREIGN PATENT DOCUMENTS

EP    0 312 209 B1    11/1992

(Continued)

OTHER PUBLICATIONS

R. A. Frost . "Speechnet: A Network of Hyperlinked Speech-Accessible Objects", International Conference on Advance Issues of E-Commerce and Web-Based Information Systems, WECWIS, 1999. Apr. 8-9. 1999, pp. 116-121, INSPEC Accession No. 6347132. Ontario, Canada.

(Continued)

*Primary Examiner*—Matthew J Sked
(74) *Attorney, Agent, or Firm*—Dorsey & Whitney LLP

(57) ABSTRACT

A method of developing an interactive system, including inputting application data representative of an application for the system, the application data including operations and parameters for the application, generating prompts on the basis of the application data, and generating grammar on the basis of the application data. The prompts and grammar are generated on the basis of a predetermined pattern or structure for the prompts and grammar. The grammar also includes predefined grammar. Grammatical inference is also executed to enhance the grammar. The grammatical inference method for developing the grammar may include processing rules of the grammar, creating additional rules representative of repeated phrases, and merging equivalent symbols of the grammar, wherein the rules define slots to represent data on which an interactive system executes operations and include symbols representing at least a phrase or term. The grammar is hierarchical and the rules include a reference count representing the number of other rules that reference the rule. Additional rules to be created during grammatical inference are determined on the basis of attribute constraints.

34 Claims, 8 Drawing Sheets

U.S. PATENT DOCUMENTS

| | | | |
|---|---|---|---|
| 5,452,397 | A | 9/1995 | Ittycheriah et al. |
| 5,642,519 | A * | 6/1997 | Martin .......................... 704/9 |
| 5,737,723 | A | 4/1998 | Riley et al. |
| 5,860,063 | A | 1/1999 | Gorin et al. |
| 5,937,385 | A * | 8/1999 | Zadrozny et al. ............ 704/257 |
| 6,044,347 | A * | 3/2000 | Abella et al. ................ 704/272 |
| 6,144,938 | A * | 11/2000 | Surace et al. ............... 704/257 |
| 6,154,722 | A | 11/2000 | Bellegarda |
| 6,269,336 | B1 | 7/2001 | Ladd et al. |
| 6,314,402 | B1 * | 11/2001 | Monaco et al. ............. 704/275 |
| 6,321,198 | B1 * | 11/2001 | Hank et al. ................. 704/270 |
| 6,411,952 | B1 | 6/2002 | Bharat et al. |
| 6,493,673 | B1 | 12/2002 | Ladd et al. |
| 6,510,411 | B1 * | 1/2003 | Norton et al. ............... 704/254 |
| 6,523,016 | B1 | 2/2003 | Michalski |
| 6,587,822 | B2 | 7/2003 | Brown et al. |
| 6,604,075 | B1 * | 8/2003 | Brown et al. ............. 704/270.1 |
| 6,618,697 | B1 * | 9/2003 | Kantrowitz et al. ........... 703/22 |
| 6,684,183 | B1 | 1/2004 | Korall et al. |
| 2001/0013001 | A1 * | 8/2001 | Brown et al. ............. 704/270.1 |
| 2001/0016074 | A1 | 8/2001 | Hamamura |
| 2002/0087325 | A1 | 7/2002 | Lee et al. |
| 2002/0188454 | A1 | 12/2002 | Sauber |
| 2003/0007609 | A1 | 1/2003 | Yuen et al. |
| 2003/0055651 | A1 | 3/2003 | Pfeiffer et al. |
| 2003/0069729 | A1 | 4/2003 | Bickley et al. |
| 2005/0091057 | A1 * | 4/2005 | Phillips et al. ........... 704/270.1 |
| 2006/0025997 | A1 | 2/2006 | Law et al. |
| 2006/0190252 | A1 | 8/2006 | Starkie |
| 2006/0203980 | A1 | 9/2006 | Starkie |
| 2008/0126089 | A1 | 5/2008 | Printz et al. |
| 2008/0319738 | A1 | 12/2008 | Liu et al. |

FOREIGN PATENT DOCUMENTS

| | | |
|---|---|---|
| EP | 0 685 955 A2 | 12/1995 |
| EP | 0 700 031 A1 | 3/1996 |
| EP | 0 890 942 A2 | 1/1999 |
| EP | 0 992 980 A2 | 4/2000 |
| EP | 1 207 518 A2 | 5/2002 |
| WO | WO 98/50907 | 11/1998 |
| WO | WO 00/05708 | 2/2000 |
| WO | WO 00/51016 | 8/2000 |
| WO | WO 00/078022 A1 | 12/2000 |
| WO | WO 02/37268 A2 | 5/2002 |
| WO | WO 02/063460 A2 | 8/2002 |
| WO | WO 02/103673 A1 | 12/2002 |
| WO | WO 2004/010678 A1 | 1/2004 |

OTHER PUBLICATIONS

Ramming, J. Christopher, "PML: A Language Interface to Distributed Voice-Response Units", Lecture Notes in Computer Science, vol. 1686, ISBN 3-540-66673-7, pp. 97-112, 1998.

Stolcke, Andreas, "Bayesian Learning of Probabilistic Language Models", Dissertation, University of California at Berkeley, 1994.

Allen, J., "Natural Language Understanding," The Benjamin/Cummings Publishing Company Inc., Redwood City, CA USA (1995) pp. 46-53.

Garofolo, J., et al., "The DARPA TIMIT Acoustic-Phonetic Continuous Speech Corpus," NIST Speech Disc CD1-1.1, (Oct. 1990) pp. 342.

Levenstein, V. I., "Binary Codes Capable of Correcting Deletions, Insertions, and Reversals," Soviet Physics-Doklady, vol. 10, No. 9, (Feb. 1966) pp. 707-710.

Mitchell, T. M., "Machine Learning," Chapter 7. Computational Learning Theory, McGraw-Hill, Boston, MA USA (1997) pp. 201-227.

Rabiner, L. R., et al., "Fundamentals of Speech Recognition," Chapter 2. The Speech Signal: Production, Perception, and Acoustic-Phonetic Characterization, Prentice Hall, Englewood Cliffs, New Jersey USA (1993) pp. 11-37.

Ryan, T. P., "Modern Regression Methods," John Wiley and Sons, Inc. (1996) pp. 21-30.

H. Ahonen, et al., "Forming Grammars For Structured Documents: An Application Of Grammatical Inference", Procedure of the Second International Colloquium on Grammatical Inference and Applications, (1994), pp. 153-167, web address: http://citeseer.ist.psu.edu/ahonen94forming.htm.

R. A. Frost, "Speechnet: A Network of Hyperlinked Speech-Accessible Objects", International Conference on Advance Issues of E-Commerce and Web-Based Information Systems, WECWIS, (1999) Apr. 8-9, 1999, pp. 116-121.

W. Minker, "Stochastic Versus Rule-Based Speech Understanding For Information Retrieval", Spoken Language Processing Group, LIMSI-CNRS, 1998. May 7, 1997, pp. 223-247.

C. Nevill, "Compression and Explanation Using Hierarchical Grammars", Computer Science Department, University of Waikato, New Zealand, The Computer Journal, vol. 40, No. 2/3 (1997) pp. 103-116.

Gold, E. M., "Language Identification in the Limit," Academic Press (1967), pp. 447-474.

Hunt, A., et al., Speech Recognition Grammar Specification Version 1.0 <http://www.w3.org/TR/speech-grammar/>, W3C Recommendation, (2004).

Nuance V-Builder 2.0 NVP Edition Technical Data Sheet, <http://www.nuance.com/assets/pdf/vbuilder_tech_data_sheet_1102.pdf>, (2002) pp. 1-2.

Nuance V-Builder Web Page, <http://web.archive.org/web/20020201161856/www.nuance.com/products/vbuilder.html>, (2002) pp. 1-2.

Telera AppBuilder Data Sheet, <http://telera.com/stageone/files/Telera/collateral/app_builder_3-2-_hi.pdf>, (2002) pp. 1-2.

Thomas, I., et al., "Extracting Phoneme Pronunciation Information from Corpara," Proceedings of the Joint Conference on New Methods in Language. Processing and Computational Language Learning, Association for Computational Linguistics, Somerset, New Jersey, (1998) pp. 175-183.

The Voice Web Application Development Environment, Telera White Paper, <http://telera.com/stageone/files/Telera/collateral/AppDev_WP_4-18-02.pdf., (2001) pp. 1-8.

Van Zaanen, M., "Bootstrapping Structure into Language: Alignment-Based Learning," Phd Thesis, The University of Leeds School of Computing, (2001), pp. i-xi and 1-128.

VoiceXML Forum, <http://www.voicexml.org>, (2007) pp. 1-2.

Voxeo Designer 2.0 Web Page, <http://web.archive.org/web/20020205091431/community/voxeo.com/vd2.isp>, (2002) pp. 1-10.

Aho, A. V., et al., "The Theory of Parsing, Translation, and Compiling,"Prentice-Hall, Englewood Cliffs, New Jersey, (1972) p. 146.

Angluin, D., "Inference of Reversible Languages," Journal of the Association for Computational Machinery, vol. 29, No. 3, (1982) pp. 741-765.

Knuth, D. E., "Semantics of Context-Free Languages," originally published in Mathematical Systems Theory 2, (1968) pp. 127-145, republished in "Selected Papers in Computer Languages," CSLI Publications, Center for the Study of Languages and Information, (2003) pp. 377-400.

Harris, Z. S., "Structural Linguistics," University of Chicago Press, Chicago, IL, USA and London, UK, 7th edition (1966), formerly entitled: "Methods in Structural Linguistics," (1951) pp. 243-299.

ISO/IEC 13211-1:1995, "Information Technology—Programming languages—Prolo—Part 1: General core," International Organization for Standardization, New York, New York, (1995) pp. 1-199.

Oates, T., et al.,"Learning κ-Reversible Context-Free Grammars from Positive Structural Examples," Department of Computer Science and Electrical Engineering, University of Maryland Baltimore County, Baltimore, MD, pp. 1-7.

Sakakibara, Y., "Efficient Learning of Context-Free Grammars from Positive Structural Examples," Information and Computation 97, (1992) pp. 23-60.

Starkie, B., "*Inferring Attribute Grammars with Structured Data for Natural Language Processing,*" 6th International Colloquium, ICGI 2002, Berlin Germany: Springer-Verlag, (2002) pp. 1-12.

Starkie, et al., Lyrebird: *Developing Spoken Dialog Systems Using Examples*, Telstra New Wave Pty Ltd., Jan. 1, 2002 XP-002519592, URL: http://www.springerlink.com/content/9fq6d51u0mqa7mtj/>, pp. 1-3.

Starkie, *Programming Spoken Dialogs Using Grammatical Inference*, Telstra New Wave Pty Ltd., AI 2001 Advances in Artificial Intelligence, XP002519591, pp. 449-460.

\* cited by examiner

METHOD OF DEVELOPING AN INTERACTIVE SYSTEM

FIELD

The present invention relates to a method of developing an interactive system and, in particular to a development system and tools for generating an application for an interactive system.

BACKGROUND

Interactive systems, such as interactive voice response systems (IVRs), are able to communicate with other machines or humans using natural language dialogue. The systems are able to prompt a communicating party for data required to execute application tasks and need to cater for a wide variety of possible responses to the prompts, particularly when communicating with humans. Developing a set of rules which defines all of the possible answers or responses to the prompts is particularly problematic and labour intensive. Also developing a structure to manage the dialogue which occurs between the communicating parties, is complex. Accordingly, it is desired to provide a method and tools which facilitates application development or at least provides a useful alternative.

SUMMARY

In accordance with the present invention there is provided a method of developing an interactive system, including:

inputting an application file including application data representative of an application for said system, said application data including operations and input and return parameters, with parameter types, for said application;

generating a dialogue state machine on the basis of said application data, said state machine including slots for each operation and each input parameter, said slots defining data on which said interactive system executes the operations;

generating prompts on the basis of said application data including a prompt listing said operations; and generating grammar on the basis of said application data, said grammar including slots for each operation and input parameters to return data of said parameter types to said state machine.

The present invention also provides a system for developing an interactive system, including:

means for inputting an application file including application data representative of an application for said system, said application data including operations and input and return parameters, with parameter types, for said application;

means for generating a dialogue state machine on the basis of said application data, said state machine including slots for each operation and each input parameter, said slots defining data on which said interactive system executes the operations;

means for generating prompts on the basis of said application data including a prompt listing said operations; and means for generating grammar on the basis of said application data, said grammar including slots for each operation and input parameters to return data of said parameter types to said state machine.

The present invention also provides a development tool for an interactive system, stored on a computer readable media, including:

code for inputting an application file including application data representative of an application for said system, said application data including operations and input and return parameters, with parameter types, for said application;

code for generating a dialogue state machine on the basis of said application data, said state machine including slots for each operation and each input parameter, said slots defining data on which said interactive system executes the operations;

code for generating prompts on the basis of said application data including a prompt listing said operations; and code for generating grammar on the basis of said application data, said grammar including slots for each operation and input parameters to return data of said parameter types to said state machine.

The present invention also provides a grammatical inference method for developing grammar, including processing rules of the grammar, creating additional rules representative of repeated phrases, and merging equivalent symbols of the grammar, wherein said rules define slots to represent data on which an interactive system executes operations and include symbols representing at least a phrase or term.

BRIEF DESCRIPTION OF THE DRAWINGS

Preferred embodiments of the present invention are hereinafter described, by way of example only, with reference to the accompanying drawings, wherein.

DETAILED DESCRIPTION OF PREFERRED EMBODIMENTS

Figure 1:
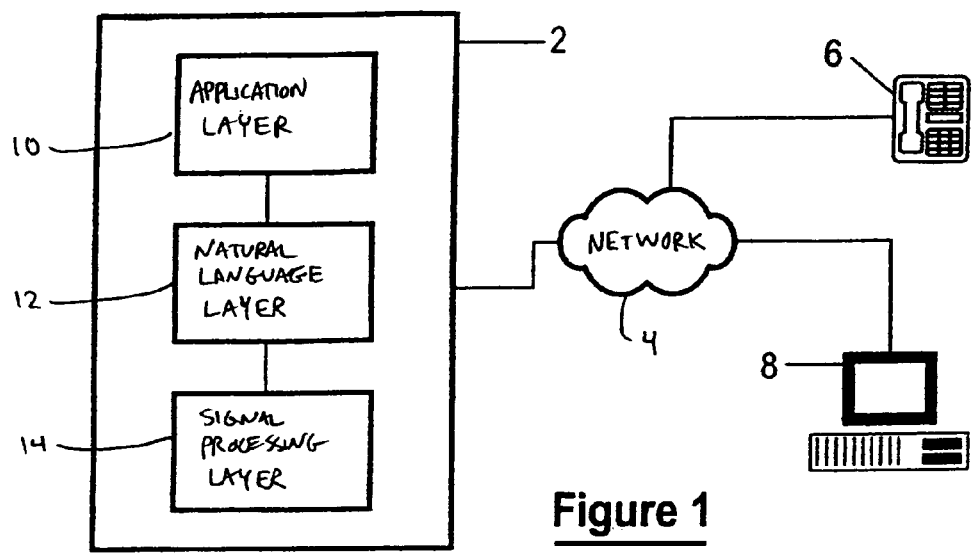
FIG. 1 is a block diagram of a preferred embodiment of an interactive system connected to a communications network.

An interactive system, as shown in FIG. 1, is able to communicate with another party, being a human or machine, using a natural language dialogue. A communication path is established with the party over a communications network 4, such as the PSTN and/or Internet. The path is between the system 2 and a communications terminal, such as a standard telephone 6 or computer system 8. When the communicating party is human and a voice terminal, such as the telephone 6, is used the system 2 converts prompts for the party to speech for delivery to the terminal, and interprets speech received from the terminal. When communicating with a machine, such as the computer 8, text data representative of the prompts and responses can be passed between the machines 2 and 8. The architecture of the system 2 can be considered to be divided into three distinct layers 10 to 14, an application layer 10, a natural language processing layer 12 and a signal processing layer 14. The application layer 10 defines an application for the system 2, such as a bill payment service, a customer service operation or a sales service. The application identifies the operations and transactions to be executed by the system 2. The natural language processing layer 12 defines the prompts to be generated by the system 2, the grammar which is acceptable in return and the different operation states and state transitions of the system 2. The signal processing layer 14 handles the communications interface with the network 4, the terminals 6 and 8, and the data processing required for the interface, such as speech generation and recognition.

Figure 2:
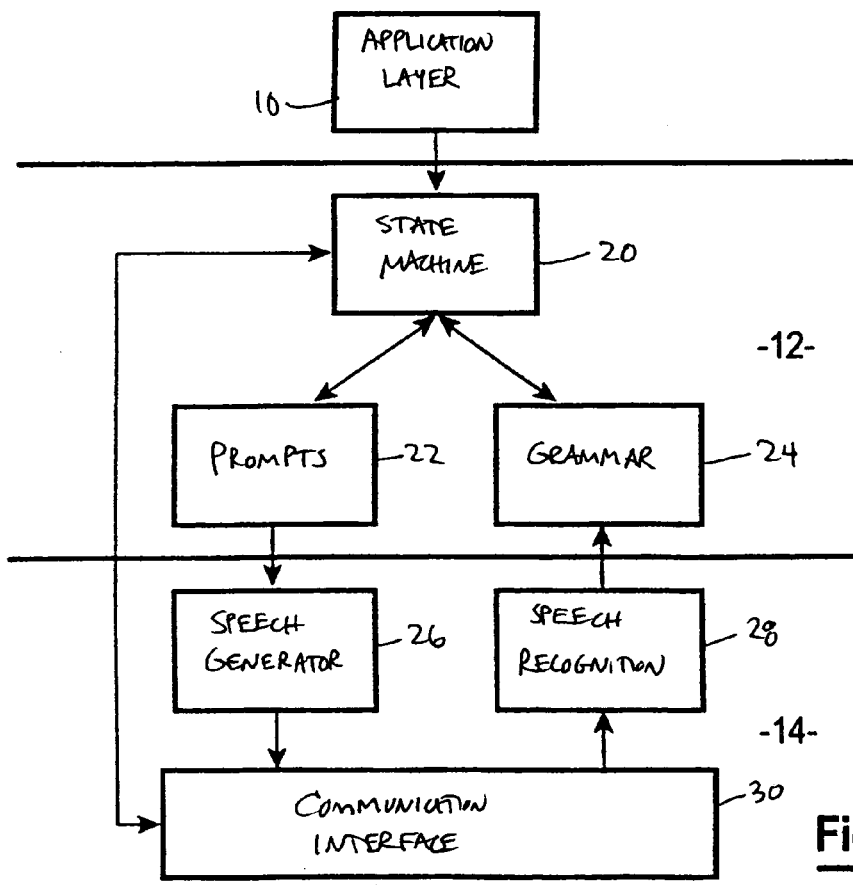
FIG. 2 is a more detailed block diagram of the interactive system.

The natural language process layer 12, as shown in FIG. 2, includes a finite state machine (FSM) 20, the prompts 22 and the grammar 24. The FSM 20 controls the states for the system 2 and the state transition and accordingly controls the decisions and tasks executed by the system 2. The FSM 20 effectively performs dialogue management for the system 2, so as to control selective transmission of the prompts 22 and act in response to the grammar 24. The prompts 22 are words of questions which can be sent by the system 2. The grammar 24 is a set of rules stipulating words and/or phrases which form acceptable answers to the prompts. The rules also define slots in the answers which constitute parameters required by the FSM 20 for execution of decisions and tasks. Accordingly, the slots are also defined in the FSM 20. The prompts, on instruction from the FSM 20, are selectively passed to a speech generator 26 for conversion into speech or voice and transmission to the terminals 6 or 8 using a communications interface 30 of the system 2. Responses received from a party are received by the communications interface 30 and are converted to representative data by a speech recognition module 28. The response data is passed by the module 28 to the grammar 24 for processing. The grammar 24 interprets the responses and passes operation instructions and operation data from the slots to the FSM 20.

The interactive system 2 may take a number of forms, as will be understood by those skilled in the art, ranging from a hand held mobile device to a distributed computer system. For simplicity, the preferred embodiments are described hereinafter with reference to the interactive system being an IVR. IVRs are produced by a number of telecommunications equipment providers, for example the Voice Processing Service (VPS) by Periphonics Inc. The parts 26, 28 and 30 of the signal processing layer are normally standard hardware and software components provided with the IVR. A developer would then be required to define at length program code, which can be compiled or interpreted, for the components 20, 22 and 24 of the prompt layer 12. This is an extremely onerous task which the preferred embodiments seek to alleviate. The speech recognition accuracy obtained by the system is also dependent on the coverage of the grammar. If it is too broad recognition may degrade, and if it is too narrow, recognition performance will also be degraded by trying to match an unexpected phrase against a list of encrypted phrases. The preferred embodiments also seek to obtain optimal speech recognition accuracy early in the applications life cycle by learning grammars from examples and using prior knowledge.

Figure 3:
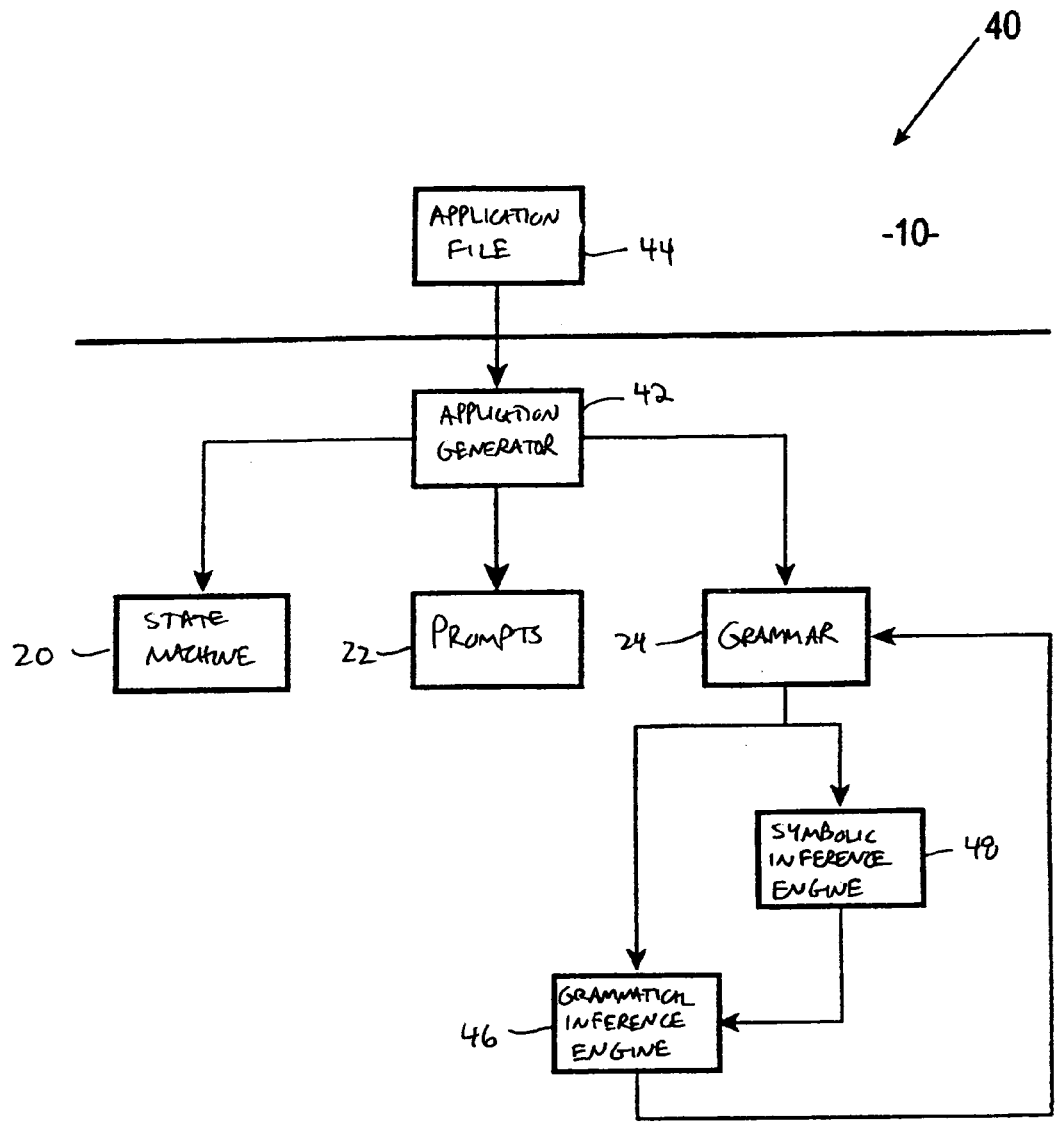
FIG. 3 is a preferred embodiment of a development system for the interactive system.

A development system 40, as shown in FIG. 3, includes an application generator 42 which operates on an application file 44 to generate an FSM 20, prompts 22 and grammar 24. The grammar 24 is refined by a grammatical inference engine 46. The application file 44 can be considered to define the application layer 10. The file 44 includes semantic data which describes semantics to be used in the IVR 2. The file defines the operations to be executed by the system 2 and the parameters required to execute the operations. An example of an application file 44 for a stock trading application is shown in Appendix 1. The operations defined are "buy", "sell" and "quote". The operations each have a number of input parameters defined by a parameter name and a number of output or return parameters defined by a return name, with all of the parameters being allocated a parameter type. The parameter types are predefined in an extendible type library. This library can be extended using a type definition file, a grammar file and a slots file, as described hereinafter, and may include integers, real numbers, dates, times and money amounts. Parameters types can also be defined by the developer in a list of items. The example of Appendix 1 includes a list of stocks to be used by the application. A list of items may be products, companies, options or any item of interest. The operations "sell" and "quote" are defined as requiring a user to be prompted to confirm that the input parameters are correct before proceeding with the operation. The application file can also be used to define additional information that can be obtained from a user of the IVR, such as a user's account number and PIN. Initial data such as this can be considered to be preamble parameters which are collected before a top-level state of the FSM 20 is entered, and are used as global variables. Global variables for the IVR 2 are used in all operations of the IVR. The names of the operations are used in the grammar 24 as keywords to signify execution of the operation. For example, a user may respond to a prompt by saying "sell" or "sell all my holdings in BHP".

The finite state machine 20, the prompts 22 and the grammar 24 generated by the application generator 42 on the basis of the application file 44 of Appendix 1 are shown in Appendices 2, 3 and 5, respectively. A slot is defined for each input parameter name, as well as a slot for "operation". The slots are therefore operation, stockname, number and price.

The finite state machine 20 of the stock trading example is written in the ITUs Specification Description Language (SDL) of the ITU. The FSM 20 includes a number of procedures with variables, and are similar to subroutines in that a stack is used to control each procedure's behaviour, yet, a procedure can include states. An FSM 20 is generated by the application generator 42 executing the following steps:

(a) Create an initial top-level state.

(b) For each operation of the application file 44 create a state transition from the top-level state.

(c) For each parameter create a variable. The name of the variable is globally unique, which is achieved by prepending the operation name to the parameter name.

(d) For each state transition related to an operation, set all input parameters that may be obtained in a first response from a user to a value, otherwise reset the parameters to a value representing "null" or "unknown". A call is made to a nested state machine, such as an SDL procedure, to check each parameter in turn. If an operation needs to be confirmed, a procedure is established to ask the user for confirmation, otherwise the operation is executed. The results of the operation are passed to the output parameters and forwarded to the user prior to returning to the top-level state.

(e) A number of procedures are established for generic operations for IVRs, such as help, cancel, repeat and operator.

(f) For each input parameter that does not have a default, a nested procedure is established to determine if a parameter has been set to a value obtained by a response. If it is not set, a default is used.

(g) For each input parameter a nested procedure is created to check if an incoming message or response sets a parameter. If the parameter is set in the incoming message, the variable relating to the parameter is set.

(h) For each parameter that does not have a default, a nested procedure is created to see if the parameter has been already set. If it is not set, the procedure prompts the user for the parameter.

The grammar 24, shown in Appendix 5, is in a format used by the preferred embodiment. This grammar is also repeated in the Nuance format in Appendix 6. Appendix 7 shows an alternative grammar format using the Nuance format. The grammar has a hierarchical structure, similar to a tree structure, where the nodes can be considered to be symbols that are either terminal or non-terminal. A terminal symbol represents a specific word. A non-terminal symbol represents other symbols and can be expanded into a set of symbols using a rule of the grammar. A rule defines a relationship between a non-terminal and symbols it can represent. For example, buy, sell, cancel, repeat, help and quit are terminals, whereas CommonStockCmds and WaitAskbuystockname are non-terminals. A terminal is shown in the Appendix and herein as any string of characters beginning with lowercase letter. A NonTerminal is any string of characters beginning with uppercase letter, whereas Feature & Value is any string of alphanumerics including '.' and lines beginning with ";" are comments.

The syntax of the grammar format used by the preferred embodiment, in Backaus Naur Form, is shown in Appendix 4, and an example of this is given below:

!S→from Location:x1 on Date:x2 (10,1) {operation=fly from=$x1.location date.month=$x2.date.month date.year=$x2.date.year date.dom=$x2.date.dom}

In this example the '!' signifies that the rule is fixed and is not to be altered by any learning process. The symbol Location is a non-terminal and can be expanded into other symbols such as melbourne. This non-terminal Location returns a value. The returned value from the first instance of Location in the rule is stored in the x1 variable and the second one into x2. There have been ten observations that use this rule and one other rule makes reference to this rule. The rule defines three slot specification rules that define the value the rule will return. The first states that the operation slot will always be set to the value 'fly'. The from slot is set the value of the location slot stored in the variable x1. The example above has its slot specification rules written in an absolute form. Alternatively a relative form can be used. The same rule written in relative form would be !S→from Location:x1 on Date:x2 (10,1) {operation=fly from=$2.location date.month=$4.date.month date.year=$4.date.year date.dom=$4.date.dom}

In this form, instead of referencing variables such as x1 or x2, reference is made to which symbol the slot value is extracted from. A third form is the non-terminal relative form which would be !S→from Location:x1 on Date:x2 (10,1) {operation=fly from=#1.location date.month=#2.date.month date.year=#2.date.year date.dom=$2.date.dom}

In this case the number represents the non-terminal index in the rule rather than the symbol index.

The grammar of Appendix 6 is the same grammar written in the Nuance grammar format. This is generated by executing the following steps:

(a) For each state in the FSM 20 a top-level grammar is created.
(b) For each top-level grammar a common set of commands are included, e.g. cancel, help, repeat and quit.
(c) A non-terminal is created for each enumerated item from the application file 44.
(d) For each operation a non-terminal is created that represents that different words can be used to request that operation, and the operation name is placed into the non-terminal.
(e) For the top-level grammar attached to the top-level state, e.g. TopLevelStock, a non-terminal is added for each operation, to which is added a slot specification rule containing the operation slot. A slot specification rule or attribute is a set of key value pairs defining a slot value. For example the attribute "{(operation buy)}" is added to the non-terminal "GR_buy".
(f) For each top-level grammar that corresponds to a state requesting an input parameter, a non-terminal is added that returns to the FSM an element of the requested type. Predefined rules are established for non-terminals that represent predefined types of parameters, e.g. money and integer.
(g) For each non-terminal that is added to a top-level grammar, slot specification rules are added that pass the slots that are filled in the rules below the non-terminal to the top level rule. Input parameters may be either enumerated types, integers or data structures. For instance the data type date, may have a day of week, day of month, year and month slot. Where a parameter is a structured type, one slot specification rule is required for each member in the structure. For instance date.year=$x.date.year. To accommodate this conversion a type definition file is provided, an example of which is shown in Appendix 8. In addition to the type definition file, a grammar file is required to define a structured type.
(h) Predefined grammars are then attached to the generated grammar file to complete the application grammar file. These grammars are for the predefined types such as money or integer. An example grammar is shown in Appendix 9. In these rules there is a '!' attached to the rules in the predefined grammar. This '!' is used to indicate that these rules are fixed and are not to be changed by subsequent grammatical inference.

Appendix 10 is the grammar generated by the process with the predefined grammars.

The prompts 22 of Appendix 3 are generated from the application file 44 and for the example are written in the Clips language. The application generator 42 generates the prompts by executing the following steps:

(a) The initial top-level prompt is set to be "Welcome to the stock application.

Please say one of the following". The prompt then lists the names of the operations, e.g. "buy, sell or quote".

(b) For the prompts where a parameter is being prompted for, a template associated with the parameter type is called and used to generate the prompt. Most of these prompts are in the form of "Please say the X", where X is the parameter name.

(c) For each state in the FSM, a help prompt can be played to the user if requested or if the FSM determines it is required. For prompts where the parameter being prompted for requires a corresponding help prompt, as determined by the parameter type, a template for help prompts associated with the parameter type is used to generate the prompt. These take the form of "Please say the X", where X is the parameter name and this is immediately followed by an example, such as "For example, three hundred and twenty five dollars and fifty cents". For enumerated parameters, the first three elements in the enumeration list can be used to form the example in the prompt.

The grammar generated by the application generator 42 can be significantly enhanced to cater for a wide variety of responses. A grammatical inference engine 46 is able to operate on response examples or observations to create additional grammars to extend the grammar 24. The examples can be provided directly to the grammatical inference engine 46 from observations recorded by the IVR. Examples can also be provided from a symbolic inference engine 48 which can generates additional examples from the predefined grammar 24. The symbolic inference engine 48 uses a linguistic and/or symbolic manipulation to extend the examples, and can rely on synonyms or antonyms extracted from a thesaurus. The symbolic inference engine 48 may also accommodate cooperative responses, which may provide additional useful information to a prompt. For instance, the prompt may be "What time would you like to travel to Melbourne?", and a cooperative response would be "I want to go to Malvern not Melbourne". Another form of cooperative response is a pre-emptive response, such as to the prompt "Do you have a fax machine I could fax the information to?", the response may be "Yes my fax number is 9254 2770". Whilst a number of different grammatical inference engines could be used to extend the grammar 24, described below is a new model merging process 50 for grammatical inference that is particularly advantageous and efficient, and is executed by the engine 46.

Figure 4:
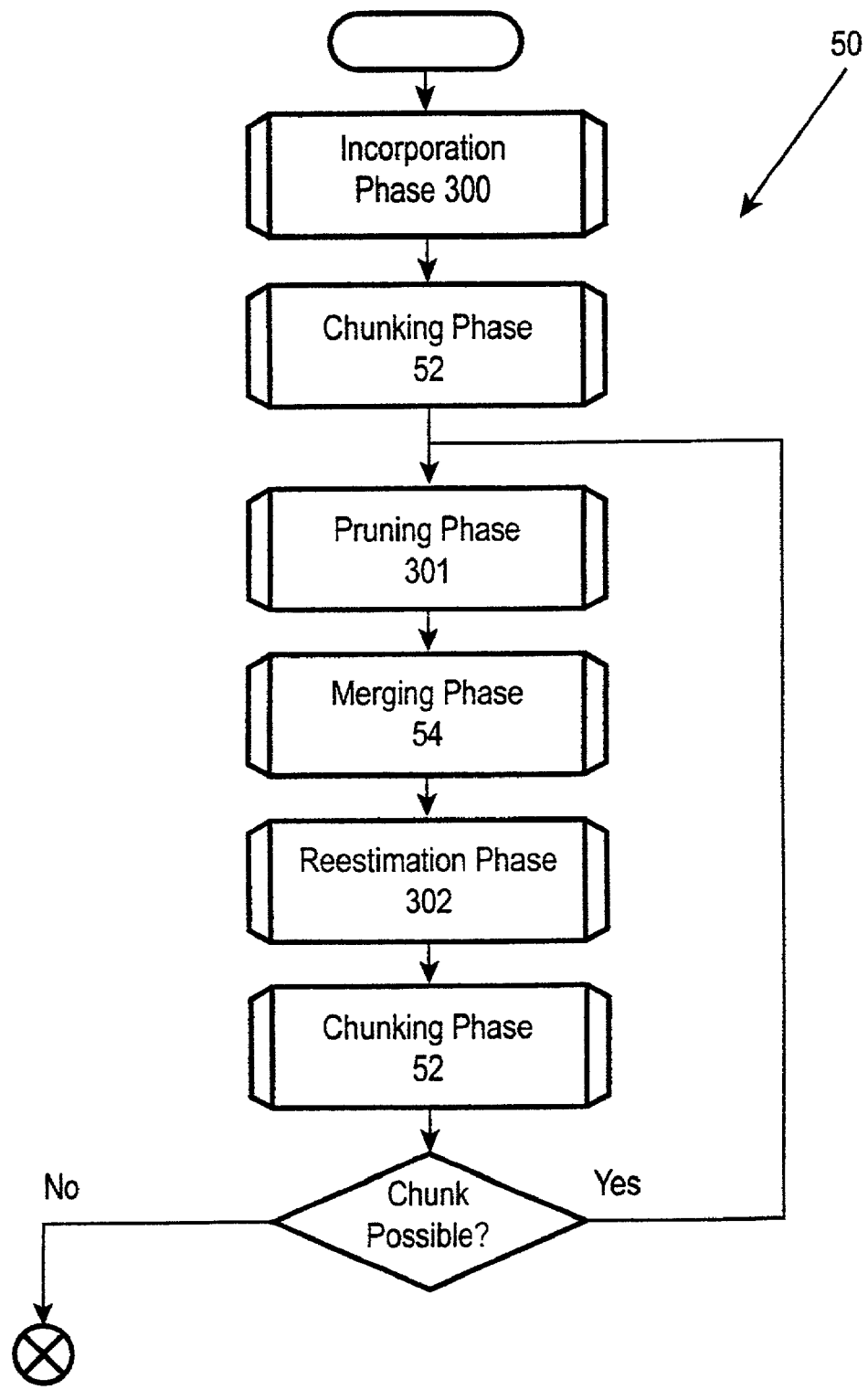
FIG. 4 is a flow diagram of a model merging process of the development system.

The model merging process 50 of the grammatical inference engine 46, as shown in FIG. 4, operates on the grammar 24 and additional observations.

The model merging process 50 is based on the following principles:

(1) Whenever a high correlation between a sequence of two or more symbols and some slot specification rules is observed, a new non-terminal and rule are created. In representing the rule, the new non-terminal is placed on the left hand side of the rule and the observed repeated sequence of symbols on the right hand side, as shown below. The slot specification rules are attached to the new rule. All observed sequences of the symbols on the right hand side of the new rule in the grammar are replaced by the new non-terminal. This phrase creation will only occur when there is more than one instance of a repeated set of phrases. The exception to this is for single words. If there is a high correlation between an attribute and a symbol, a new rule will be created. New rules are added in an order such that the rules with the most evidence are created first.

(2) The new rule needs to be applied more than once. A rule which is created during a chunking process 52 is deleted, as discussed below, if it is not used more than once in parsing the observations and it is not a top-level rule. The exception to this rule is when the rule is of length one, and has slot specification rules attached to it. A top-level rule of a grammar has a non-terminal on the left hand side which represents the rule and resides at the highest level of the grammar.

(3) In a merging phase 54, merging evidence patterns, described below, are used to identify symbols used interchangeably in the observations. The process seeks two symbols used interchangeably in the same place in a sequence of words. For merging to occur the rules need to have compatible slot specification rules, and the non-terminals have to return the same set of slots.

(4) The rules are each allocated a hyperparameter which correlates to the number of times the rule is used for the observations parsed by the generated grammar. Probabilities for the rules can then be determined from the hyperparameters. The grammatical inference engine 46 continually changes the structure of the grammar 24, and the use of the hyperparameters significantly reduces the amount of computation required as opposed to having to calculate and store rule probabilities. The hyperparameters are also used to remove redundant rules, and ambiguity during a reestimation phase 302. A discussion on the use of hyperparameters to calculate rule probabilities for model merging is provided in Andreas Stolcke, "Bayesian Learning of Probabilistic Language Models", 1996, Doctoral Dissertation, Department of Electrical Engineering and Computer Science, University of California, Berkeley, available at ftp://ftp.icsi.berkeley.edu/pub/ai/Stolcke/thesis.ps.z.

To attach meaning to the phrases, the model merging process 50 is based on an assumption that all slot specification rules are assignment operators, and the result of applying slot specification rules to a production rule is visible on the observations. Also it is assumed that these slot specification rules are applied universally. Application of the assumptions enables the model merging process to learn beyond what it has seen or received and to generalise. Under the assumptions, each slot specification rule may contribute either a slot-value pair, or a value to the observation. For instance given the two rules:

S→from Location:x1 (1,1) {from=$x1.from}
Location→Melbourne (1,1) {from=melbourne}
S→to Location:x1 (1,1) {to=$x1.from} the observation "from melbourne" with the slots "from=melbourne" can be generated. In this example the first rule contributes the slots "from=melbourne" while the second rule contributes the value "melbourne".

If the last two rules were used to generate the phrase "to melbourne" with the slots "to=melbourne" the second rule contributes the value "melbourne" while the third rule contributes the slots "to=melbourne".

There are a number of ways to determine correlation between the slots contributed by a rule and the slots of an observation. If the event A is the event that a rule contributes a particular slot value pair or value, and the event B is that an observation generated using that particular rule possesses that slot value pair or value, then for error free data, $P(B/A)=1$ because event A implies event B. If A implies B, then not B implies not A. Using this technique the list of possible slot value pairs or values a rule contributes can be reduced, once a candidate rule is given. To do this the notation f=v is used to imply that a rule contributes the slot value pair f=v and the notation *=v to imply that a rule contributes the value v.

Given a particular set of rules, and observations generated using those rules, and the attributes attached to the rules a set of slot value pairs and slot values can be determined that a rule can contribute. This is done as follows:

1. For every slot value pair f=v attached to an observation, add the set of potential slot values and values contributed by a rule to be {f=v, *=v} This set is known as the set of attribute constraints of the observation.

2. The attribute constraints of a rule is the intersection of all of the attribute constraints of the observations that are generated by that rule. The attribute constraints can then be converted to slot specification rules. The actual slot specification rules will most likely be a subset of the slot specification rules obtained from the attribute constraints. This is because when A implies B then not B implies not A but B does not imply A.

In the more general case when a grammar is learnt from examples, and there is no starting grammar, the actual rules are unknown. To overcome this problem candidate rules with right hand sides of length one and two can be considered. Once a grammar has been constructed with rules of length one and two, longer rules can be constructed by representing them as rules of length two, where one or more of the symbols on the right hand side can be expanded into more symbols.

This technique works best when there is no errors in the tagging of the data. An extension of the process would involve using P(A/B)~1, i.e. for instance P(A/B)=0.9.

Figure 5:
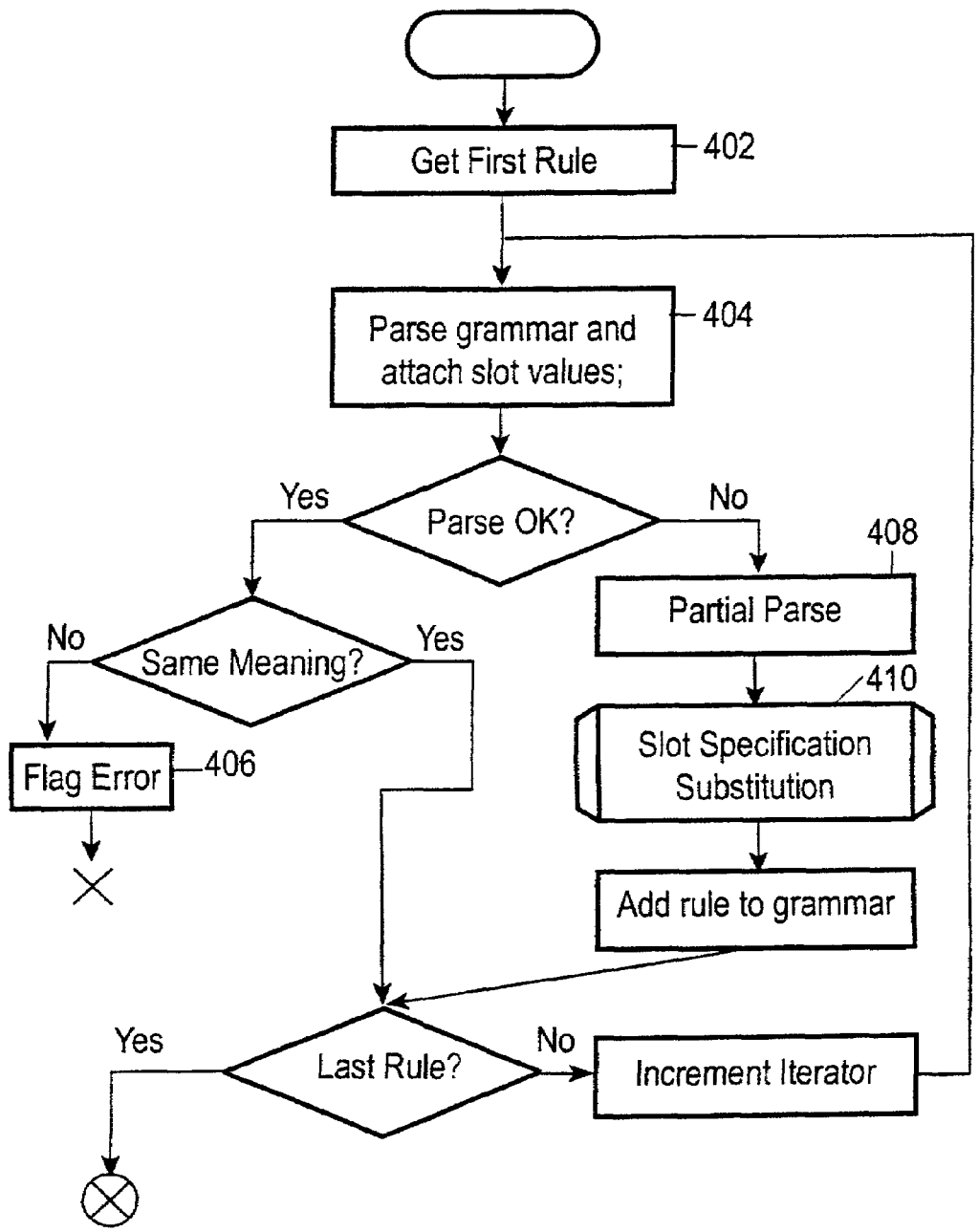
FIG. 5 is a flow diagram of an incorporation phase of the model merging process.

The model merging process 50 has five distinct phases, an incorporation phase 300, a chunking phase 52, a pruning phase 301, a merging phase 54 and a reestimation phase 302, as shown in FIG. 4. During the incorporation phase 300, as shown in FIG. 5, the grammar is extended to include previously unpredicted phrases. A list of observed phrases (observations) is presented to the grammatical inference engine, at step 402, along with the dialog state that the phrases were collected in, plus a set of slots. The phrases are then parsed at step 404 by the grammatical inference engine using a bottom up chart parser. If the phrase can be parsed, the parser attaches a meaning to the phrase in the form of a set of attribute slots. If the meaning attached to the observation is the same as that attached to it by the parser, the grammar does not need to be extended to incorporate the phrase. If the meaning is not the same, then an error will be flagged, at step 406, the user alerted and the execution halted. If the observation cannot be parsed using the existing grammar, the grammar needs to be extended to incorporate it. For instance the phrase "buy three hundred shares of abador gold for three dollars fifty a share" was observed once in the dialog state "TopLevelStock" with the slots {operation=buy, stockname="abador gold" price.dollars=3 price.cents=0 price.modifer=per_share}

This could be added to the grammar as a new rule as follows:

.TopLevelStock→buy three hundred shares of abador gold for three dollars fifty a share (1,1) operation=buy, stockname="abador gold" price.dollars=3 price.cents=0 price.modifer=per_share However it is more advantageous to first generalise the rule, using a bottom-up partial parser, so that a rule of the form.

Figure 6:
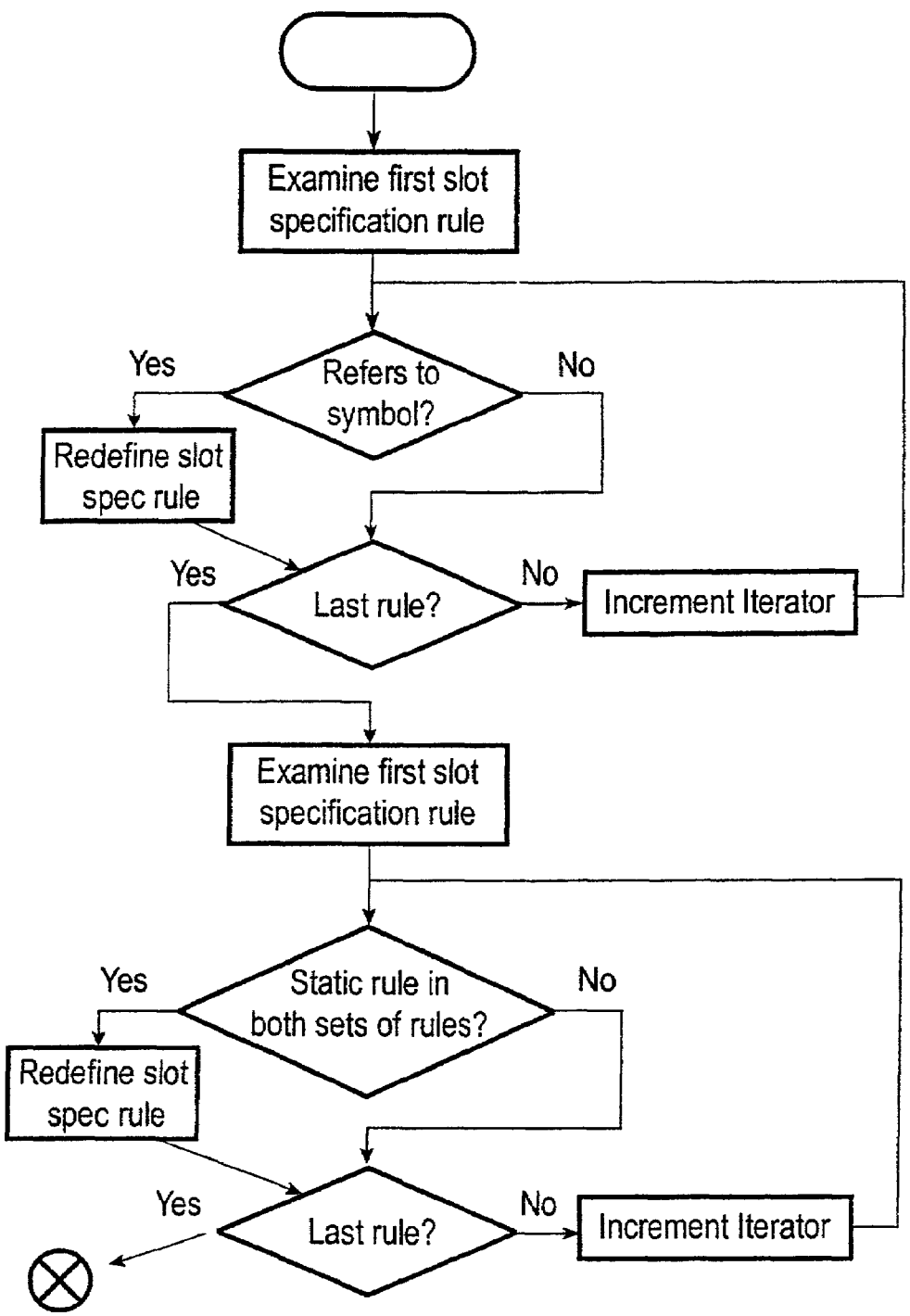
FIG. 6 is a flow diagram of a slot specification rule substitution process of the model merging process.

.TopLevelStock→buy Number:x1 of StockName:x2 for Money:x3 a share (1,1) operation=buy, stockname=$x2.stockname price.dollars=$x3.price.dollars price.cents=$x3.price.cents price.modifer=per_share The observation is partially parsed, at step 408. This creates a small number of parse trees, which return slot values. Where partial parses overlap preference is given to longer parse trees, with a left to right bias. These slot definitions are substituted into the slot definitions of the observations, one at a time, from the left to right, using the slot specification rule substitution process 410, as shown in FIG. 6. This process is also used in the chunking phase.

The slot specification rule substitution process can be used to substitute slot specification rules attached to rules with one, two or zero symbols on the right hand side. In the case where it is being used for substituting in new rules, created from observations, the new rule will have only explicit slot specification rules, i.e. x=y and none of the form x=$y.z.

The slot specification rule substitution process takes five parameters and makes reference to a type manager object, that defines the types of all of the slots used in the grammar.

The five parameters are the slot specification rules of the rule being substituted into, the slot specification rules of the rule that is being referenced, the symbol on the left hand side of the rule that is being referenced, and the variables attached to the first and second symbols on the right hand side of the rule that is being referenced in the rule that is being substituted into. Under certain circumstances these last three symbols can be undefined. For instance where the rule that is being referenced has only one symbol on it right hand side, the second symbol is marked as undefined.

For instance the rule being substituted into may be

S→I want to fly from CITY:x to CITY:y (1,1) {note=tellfrom from=$x.city to=$y.city}

While the rule being referenced may be

X1→from CITY:x (1,1) {city=$x.city note=tellfrom}

In this case the slot specification rules of the rule that is being substituted into would be {from=$x.city to=$y.city note=tellfrom} the slot specification rules of the rule that is being referenced would be

{city=$x.city note=tellfrom} the symbol on the left hand side of the rule would be X1 the first symbol would be "from" and second symbols would be "CITY", therefore the two variables referencing these symbols are undefined and x respectively.

Each slot definition rule attached to the rule being substituted into is examined one at a time. If it refers to one of the symbols on the right hand side of the rule that is being referenced, it needs to be modified. For instance the slot specification rule from=$x.city makes reference to the variable x., and thus needs to be modified. The slot specification rule "city=$x.city" is examined. Because it returns a slot of type city, the slot specification rule is converted to "from=$X1.city". If there had been no reference to the slot "city", the type manager would have been examined and an appropriate type defined. For instance if a reference was made to a "from" slot, and the rule did not define a "from" slot, the type manager would be referred to. The type of the "from" slot would be defined as "city", and the first slot associated with the type "city" would be used. In this case this would be the slot "city".

This would be repeated for all slot definition rules in the slot specification rules defined in the rule being substituted into.

The slot specification rules in the rule being substituted into are then checked for static slot specification rules. A static slot specification rule is one where the slot is explicitly defined such as note=tellfrom If slot specification rules of the rule being substituted into are then checked one at a time for static rules that exist in the rule being referenced. In this example the specification rule "note=tellfrom" is located in both sets of rules, and thus the reference to note=tellfrom in the rule being substituted into is replaced by note=$X1.note.

At the end of the process these two rules would be as follows.

S→I want to fly X1:X1 to CITY:y (1,1) {note=$X1.note from=$X1.city to=$y.city}

X1→from CITY:x (1,1) {city=$x.city note=tellfrom}

The model merging process 50 can also operate when there is no starting grammar. When this is the case the observations are added to the grammar verbatim for instance the observation "buy three hundred shares of abador gold for three dollars fifty a share" observed in the state "TopLevelStock" with the slots {operation=buy, stockname="abador gold" price.dollars=3 price.cents=0 price.modifer=per_share} would result in the following rule being added to the grammar.

.TopLevelStock buy three hundred shares of abador gold for three dollars fifty a share (1,1) {operation=buy, stockname="abador gold" price.dollars=3 price.cents=0 price.modifer=per_share}

During the chunking phase 52 repeated sequences of words, i.e. phrases, in the grammar that appear in more than one rule are placed by a reference to a new rule which contains the repeated phrase. For instance prior to the chunking phase the rules for two non-terminals may be as follows:

A→b c d e
B→x c d k

After the chunking phase 52 three rules may be defined as follows:

A→b C e
B→x C k
C→c d

This can be expressed as the new rule C→c d being substituted into the rule A→b c d e.

The chunking phase also needs to attach slot specification rules to the new phrases. Likewise when a production rule is substituted into another production rule, the slot specification rules of the new production rule is substituted into the slot specification rules of the production rule that references it.

For instance prior to the chunking phase the rules for two non-terminals may be:

.TopLevelStock→buy Number:x1 of StockName:x2 for Money:x3 a share (1,1) operation=buy, stockname=$x2.stockname price.dollars=$x3.price.dollars price.cents=$x3.price.cents price.modifer=per_share .WaitAskbuyprice→Money:x1 a share (1,1) operation=buyprice price.dollars=$x1.price.dollars price.cents=$x1.price.cents price.modifer=per_share After the chunking phase 52 three rules may be defined as follows:

.TopLevelStock→buy Number:x1 of StockName:x2 for Money:x3 X1:x4 (1,1) operation=buy, stockname=$x2.stockname price.dollars=$x3.price.dollars price.cents=$x3.price.cents price.modifer=$x4.price.modifer .WaitAskbuyprice→Money:x1 X1:x2 (1,1) operation=buyprice price.dollars=$x1.price.dollars price.cents=$x1.price.cents price.modifer=$x2.price.modifer X1→a share (2,2) price.modifer=per_share In this case the slot specification rule "price.modifer=per_share" is substituted into the slot specification, operation=buy, stockname=$x2.stockname price.dollars=$x3.price.dollars price.cents=$x3.price.cents price.modifer=per_share The result of this is operation=buy, stockname=$x2.stockname price.dollars=$x3.price.dollars price.cents=$x3.price.cents price.modifer=$x4.price.modifer The merging phase 54 is able to merge symbols which can be considered to be equivalent. The symbols may be terminal or non-terminal. For example, if A and B are assumed to be same in the following rules, X→a A b h
Y→q B h k
A→y u i
B→Z t y Then after merging A and B into C the grammar would be X→a C b h
Y→q C h k
C→y u i
C→Z t y The symbols A and B can be merged into symbol C when the phrases are identified by merging evidence patterns, discussed below, as being interchangeable.

Merging reduces the complexity of a grammar and generalises the grammar so that it can handle additional phrases. For instance consider the following fragment of a grammar.

S→from X1:x1 (1,1) from=$x1.from
S→to X1:x1 (1,1) to=$x1.from
S→from X2:x1 (1,1) from=$x1.from
X1→melbourne (1,1) from=melbourne
X2→sydney (1,1) from=sydney In this example the symbols X1 and X2 are merged into symbol X3. Creating the following grammar.

S→from X3:x1 (2,1) from=$x1.from
S→to X3:x1 (1,1) to=$x1.from
X3→melbourne (1,1) from=melbourne
X3→sydney (1,1) from=sydney This new grammar can generate the observation "to sydney" with the meaning to=sydney which the starting grammar could not.

The chunking process 52 does not generalise the grammar, but may create a new non-terminal that adds to the hierarchical structure of the grammar.

The reestimation phase 302 uses statistical techniques to remove ambiguity, and to remove redundant rules.

For instance consider the observations

Observation 1.) From melbourne to melbourne (1) {from=melbourne to=melbourne}

Observation 2.) From melbourne to perth (1) {from=melbourne, to=perth}

Observation 3.) From perth to melbourne (1) {from=perth to=melbourne}

After the chunking, and merging phases the result may be the following grammar.

Rule 1.) S→from X1:x1 to X1:x2 (1,1) {from=$x1.to to=$x1.to}
Rule 2.) S→from X1:x1 to X1:x2 (2,1) {from=$x1.to to=$x2.to}
Rule 3.) X1→melbourne (4,2) {to=melbourne}
Rule 4.) X1→perth (2,2) {to=perth}

In this example there are two numbers in brackets prior to the slot specification rules. The first number represents the number of observations that use this rule. The second number represents the number of rules that reference this rule. The reestimation phase reestimates the first number so that there are less rules.

Each observation in the training set is parsed by the grammar. Where more than one parse is possible, the parse with the highest probability that gives the correct meaning is considered to the correct parse. This is known as the Viterbi parse. If there are an equal number of possible parses, the observation is considered to be equally parsed by all of them.

Consider the following observation, from melbourne to melbourne {from=melbourne to=melbourne}

It can be parsed using rules 1, 3 & 3. This would give the parse tree (S from (X1 melbourne) to (X1 melbourne)) with the slots {from=melbourne to=melbourne} and with probability 1/3*4/6*4/6=0.148 or it may be parsed using rules 2, 3 & 3. This would give the parse tree (S from (X1 melbourne) to (X1 melbourne)) with the slots {from=melbourne to=melbourne} and with probability 2/3*4/6*4/6=0.296

Both give the same outcome but it is more likely that rules 2 & 3 are used and thus for the purposes of reestimation this does not use rule 1.

Observations 2 can only be parsed using the second rule as follows.

(S from (X1 melbourne) to (X1 perth)) {from=melbourne, to=perth} using rules 2, 3 & 4

An alternative parse using rules 1, 3 & 4

(S from (X1 melbourne) to (X1 perth)) would attach the slots {from=melbourne to=melbourne} which is incorrect because it contradicts the training data.

For the same reasons the third observation can only be parsed correctly using rules 2, 4 & 3. Giving the parse tree, (S from (X1 perth) to (X1 melbourne)) {from=perth to=melbourne} using rules 2, 4 & 3

The hyperparameters are then re-estimated using the Viterbi parse. This is done one observation at a time. The hyperparameter of each rule is set to zero for most rules, and set to 1 for fixed rules. In the example above the hyperparameters would initially be set to Rule 1.) S→from X1:x1 to X1:x2 (0,1) {from=$x1.to to=$x1.to}
Rule 2.) S→from X1:x1 to X1:x2 (0,1) {from=$x1.to to=$x2.to}
Rule 3.) X1→melbourne (0,2) {to=melbourne}
Rule 4.) X1→perth (0,2) {to=perth}

Using the Viterbi parse the rules are then incremented by the observation count. After considering observation 1 the grammar would become Rule 1.) S→from X1:x1 to X1:x2 (0,1) {from=$x1.to to=$x1.to}
Rule 2.) S→from X1:x1 to X1:x2 (1,1) {from=$x1.to to=$x2.to}
Rule 3.) X1→melbourne (2,2) {to=melbourne}
Rule 4.) X1→perth (0,2) {to=perth}

After considering observation 2 the grammar would become

Rule 1.) S→from X1:x1 to X1:x2 (0,1) {from=$x1.to to=$x1.to}
Rule 2.) S→from X1:x1 to X1:x2 (2,1) {from=$x1.to to=$x2.to}
Rule 3.) X1→melbourne (3,2) {to=melbourne}
Rule 4.) X1→perth (1,2) {to=perth}

After considering observation 3 the grammar would become

Rule 1.) S→from X1:x1 to X1:x2 (0,1) from=$x1.to to=$x1.to
Rule 2.) S→from X1:x1 to X1:x2 (3,1) {from=$x1.to to=$x2.to}
Rule 3.) X1→melbourne (4,2) {to=melbourne}
Rule 4.) X1→perth (2,2) {to=perth}

Rules that have a hyperparameter of zero would then be deleted. After reestimation the resulting grammar would be:

Rule 1.) S→from X1:x1 to X1:x2 (3,1) {from=$x1.to to=$x2.to}
Rule 2.) X1→melbourne (4,2) {to=melbourne}
Rule 3.) X1→perth (2,2) {to=perth}

The reestimation phase executes a variation of the grammatical inference inside-outside algorithm, and is used to remove ambiguity and to delete unnecessary rules.

The model merging process 50 is able to operate on a list of rules, such as the rules of the predefined grammar 24 and rules which represent observations. A rule is assigned a probability of occurring which can be calculated from the probabilities of the observations. These probabilities can be estimated by counting the number of times the observation has occurred and dividing by the total number of observations. The merging process 50 does not create or use cost functions, which have been used by some grammatical inference engines to decide steps to be executed and when execution should cease.

Rules are stored using a double linked list format where each symbol has pointers to the preceding and succeeding symbol. The format enables long rules to be shortened and lengthened without computationally expensive replication of data, and a sequence of symbols can be moved from one rule to another by changing the pointers at either end, without modifying data in between.

To meet principle (1) of the merging process during the incorporation and chunking phases, two data structures are created. The first is a Monogram table and the second is a bigram table. The monogram table has an entry for every word type in the grammar, for instance the word melbourne. This entry has a pointer to every occurrence of this word in the grammar, plus a set of attribute constraints. The bigram table has an entry for every occurrence of two successive symbols. For instance "to melbourne" or "to X1". It also has a pointer to every occurrence of this bigram in the grammar, plus a set of attribute constraints, plus a set of slot specification rules.

New rules are created during the chunking phase by first examining the monogram table and then the bigram table.

The monogram table is sorted so that the first monogram to be pulled of it has the most number of non fixed rules. If there are two candidates with the same number of non-fixed rules, the one with the least number of attribute constraints is chosen. A new rule is then created with an unique symbol on its left hand side and the symbol on its right hand side. The hyperparameter of the new rule is set to the number of observations, while a reference count is set to one. The attribute constraints attached to the monogram are then converted to a slot specification rule.

All instances of this word in the grammar are then be substituted by the new non-terminal. The slot specification rules are then modified to derive slot values from the newly formed rule. This is achieved by substituting the attributes to=melbourne from the newly created rule into the existing slot specification rules using the slot specification substitution process. For instance two rules may exist as follows:

S→to melbourne (1,1) {to=melbourne}
S→from melbourne (1,1) {from=melbourne}
A new rule is then created as follows:
X1→melbourne (2,2) {to=melbourne}
All instances of "melbourne" are then replaced by the non-terminal X1 as follows:
S→to X1 (1,1) {to=melbourne}
S→from X1 (1,1) {from=melbourne}

The bigram table and monogram table are updated as this occurs. The slot specification rules are then modified, by attempting to substitute the to=melbourne returned by X1 into the slot specification rules attached to rule S. The resulting rules would become.

S→to X1:x1 (1,1) {to=$x1.to}
S→from X1:x1 (1,1) {from=$x1.to}
X1→melbourne (2,2) {to=melbourne}

To accommodate prepositional phrases, a slot definition file is generated that assigns types to the slots to enable modification of slot specification rules. This file defines the slot name and its type. An example may be:

location
to location
from location

Once there are no more rules that can be created using the monogram table, the bigram table is examined to create new rules. The bigram table is sorted so that the first bigram to be pulled of it will have the most number of occurrences, and the least number of attribute constraints, and doesn't hide any other begrimes. In addition to storing attribute constraints for each entry in the bigram table, slot specification rules are also be stored. Whenever one of the symbols in the bigram is referenced for the purposes of slot specification, these fragments of slot specification rules are stored in the bigram table. If two different slot specification rules are used in separate production rules, that conflict, the bigram is never chinked.

A new rule is then created with an unique symbol on its left hand side and the two symbols of the bigram on its right hand side. The slot specification rules attached to the bigram are added to the newly formed rule. In addition the attribute constraints attached to the bigram are then converted to a slot specification rules and attached to the newly formed rule where this does not conflict with the slot specification rules.

All instances of this bigram in the grammar are then be substituted by the new non-terminal. The slot specification rules are modified to derive slot values from the newly formed rule. This is achieved by substituting the attributes from the newly created rule into the existing slot specification rules. For instance two rules may exist as follows:

S→to X1:x1 (1,1) {to=$x1.to}
S→from X1:x1 to X1:x2 (1,1) {from=$x1.to to=$x2.to}

A new rule is then created as follows:

X2→to X1:x1 (1,1) {to=$x1.to}

All instances of "to X1" are then replaced by the non-terminal X2 as follows:

S→X2 (1,1) {to=$x1.to}
S→from X1:x1 X2 (1,1) {from=$x1.to to=$x2.to}

The slot specification rules are then modified, by attempting to substitute the to=melbourne returned by X1 into the slot specification rules attached to rule S. The resulting rules would become S→X2:x2 (1,1) {to=$x2.to}
S→from X1:x1 X2:x2 (1,1) {from=$x1.to to=$x2.to}
X2→to X1:x1 (1,1) {to=$x1.to}

Substituting slot specification rules from newly created rules into existing rules is achieved using the slot specification substitution procedure which executes the following steps:

(1) A function substitute(Attributes substitute_into, Attribute substitute_from, Symbol new_symbol, Symbol first_symbol, Symbol second_symbol) is called.
(2) In this function all references to the bigram symbols (first_symbol and second_symbol) in the "substitute_into" set of attributes are replaced by references to the new_symbol. The slot referenced on the right hand side of the individual slot specification rule is then assigned. If the slot exists in the new rule, it is assigned to that. If it is not defined in the newly created rule, it is assigned to the first slot of that type listed in the slot definition file.
(3) If the newly created rule defines a static slot value (x=y rather than x=$y.z) and an identical static slot value exists in the rule being substituted into a reference is made from the slot specification rule to the slot returned by the newly created rule.

To meet principle (2) a reference count is attached to each rule which contains the number of other rules that reference the rule, and the reference count is distinct from the hyperparameter. When a rule refers another rule, the reference count on the other rule is incremented. When a rule ceases to use another rule, the reference count on the other rule is decremented. When the reference count for a rule becomes zero, the symbols contained in that rule are placed back in the rule which previously referred to or referenced the rule that now has a reference count of zero.

Although the monogram list and the bigram lists make reference to n-grams of length 1 and 2 respectively, rules of arbitrary length can be created, by merging rules that are only referenced by one other rule into that rule.

Operation of the chunking procedure is illustrated with reference to the following example, where the observations are:

i like coffee in the morning (10) operation=update_knowledge drink=coffee
like tea in the morning (20) operation=update_knowledge drink=tea
i'd like a cup of coffee please (5) operation=request_drink drink=coffee The number at the end of the observations above is the number of times that phrase has been observed. As defined previously, in the rules below there is a two dimensional vector (i,j) at the end of the rule. The first element i of the vector is the reference count and the second element j of the vector is the hyperparameter. In the scenario where there is no starting grammar, and the top level grammar is 'S', the grammar at the end of the incorporation phase would be:

S→i like coffee in the morning (10,1) {drink=coffee operation=update_knowledge}
S→i like tea in the morning (20,1) {drink=tea operation=update_knowledge}
S→i'd like a cup of coffee please (5,1) {drink=coffee operation=request_drink}

In addition the monogram table would be as listed below. In this listing the first number after the symbol being referenced, is the number of times that symbol appears in the grammar. The second number is the number of non-fixed rules that this symbol appears in. It is this second number that is used to determine which rule should be created first.

a 1 1 drink=coffee*=coffee*=request_drink operation=request_drink
coffee 2 2 drink=coffee*=coffee
cup 1 1 drink=coffee*=coffee*=request_drink operation=request_drink
i 2 2*=update_knowledge operation=update_knowledge
i'd 1 1 drink=coffee*=coffee*=request_drink operation=request_drink
in 2 2*=update_knowledge operation=update_knowledge
like 3 3
morning 2 2*=update_knowledge operation=update_knowledge
of 1 1 drink=coffee*=coffee*=request_drink operation=request_drink
please 1 1 drink=coffee*=coffee*=request_drink operation=request_drink
tea 1 1 drink=tea*=tea*=update_knowledge operation=update_knowledge
the 2 2*=update_knowledge operation=update_knowledge The bigram table would be
a cup 1 1 drink=coffee*=coffee*=request_drink operation=request_drink
coffee in 1 1 drink=coffee*=coffee*=update_knowledge operation=update_knowledge
coffee please 1 1 drink=coffee*=coffee*=request_drink operation=request_drink
cup of 1 1 drink=coffee*=coffee*=request_drink operation=request_drink
i like 2 2*=update_knowledge operation=update_knowledge
i'd like 1 1 drink=coffee*=coffee*=request_drink operation=request_drink
in the 2 2*=update_knowledge operation=update_knowledge

```
    like   a    1   1   drink=coffee*=coffee*=request_drink
       operation=request_drink
    like coffee 1 1 drink=coffee*=coffee*=update_knowledge
       operation=update_knowledge
    like  tea  1   1   drink=tea*=tea*=update_knowledge
       operation=update_knowledge
    of  coffee  1  1  drink=coffee*=coffee*=request_drink
       operation=request_drink
    tea  in   1   1   drink=tea*=tea*=update_knowledge
       operation=update_knowledge
    the     morning    2       2*=update_knowledge
       operation=update_knowledge
```
The chunking phase would then begin. The Monogram table would first be examined. Based on the monogram table, the first rule to be created would be X21→I (30,2) {operation=update_knowledge}

The name of the non-terminal (X21) is assigned arbitrarily. The slot specification rules are extracted from the monogram table. The hyperparameter and reference or rule count are derived from the rules into which this new rule is substituted. The resulting grammar would be.

Step 1. The rules are:

S→X21:X21 like coffee in the morning (10,1) {drink=coffee operation=$X21.operation}

S→X21:X21 like tea in the morning (20,1) {drink=tea operation=$X21.operation}

S→i'd like a cup of coffee please (5,1) {drink=coffee operation=request_drink}

X21→i (30,2) {operation=update_knowledge}

After this has occurred the monogram table becomes (the following steps 1 to step 11 are a continuation of this process):
```
    X21            2         2*=update_knowledge
       operation=update_knowledge
    a    1    1    drink=coffee*=coffee*=request_drink
       operation=request_drink
    coffee 2 2 drink=coffee*=coffee
    cup   1   1    drink=coffee*=coffee*=request_drink
       operation=request_drink
    i 1 1*=update_knowledge operation=update_knowledge
    i'd   1   1    drink=coffee*=coffee*=request_drink
       operation=request_drink
    in 2 2*=update_knowledge operation=update_knowledge
    like 3 3
    morning        2         2*=update_knowledge
       operation=update_knowledge
    of   1    1    drink=coffee*=coffee*=request_drink
       operation=request_drink
    please  1   1   drink=coffee*=coffee*=request_drink
       operation=request_drink
    tea   1   1    drink=tea*=tea*=update_knowledge
       operation=update_knowledge
    the            2         2*=update_knowledge
       operation=update_knowledge
```

Step 2

S→X21:X21 like X23:X23 in the morning (10,1) {drink=$X23.drink operation=$X21.operation}

S→X21:X21 like tea in the morning (20,1) {drink=tea operation=$X21.operation}

S→i'd like a cup of X23:X23 please (5,1) {drink=$X23.drink operation=request_drink}

X21→i (30,2) {operation=update_knowledge}

X23→coffee (15,2) {drink=coffee}
```
    X21            2         2*=update_knowledge
       operation=update_knowledge
    X23 2 2 drink=coffee*=coffee
    a    1    1    drink=coffee*=coffee*=request_drink
       operation=request_drink
    coffee 1 1 drink=coffee*=coffee
    cup   1   1    drink=coffee*=coffee*=request_drink
       operation=request_drink
    i 1 1*=update_knowledge operation=update_knowledge
    i'd   1   1    drink=coffee*=coffee*=request_drink
       operation=request_drink
    in 2 2*=update_knowledge operation=update_knowledge
    like 3 3
    morning        2         2*=update_knowledge
       operation=update_knowledge
    of   1    1    drink=coffee*=coffee*=request_drink
       operation=request_drink
    please  1   1   drink=coffee*=coffee*=request_drink
       operation=request_drink
    tea   1   1    drink=tea*=tea*=update_knowledge
       operation=update_knowledge
    the            2         2*=update_knowledge
       operation=update_knowledge
```

Step 3

S→X21:X21 like X23:X23 X24:X24 the morning (10,1) {drink=$X23.drink operation=$X21.operation}

S→X21:X21 like tea X24:X24 the morning (20,1) {drink=tea operation=$X21.operation}

S→i'd like a cup of X23:X23 please (5,1) {drink=$X23.drink operation=request_drink}

X21→i (30,2) {operation=update_knowledge}

X23→coffee (15,2) {drink=coffee}

X24→in (30,2) {operation=update_knowledge}
```
    X21            2         2*=update_knowledge
       operation=update_knowledge
    X23 2 2 drink=coffee*=coffee
    X24            2         2*=update_knowledge
       operation=update_knowledge
    a    1    1    drink=coffee*=coffee*=request_drink
       operation=request_drink
    coffee 1 1 drink=coffee*=coffee
    cup   1   1    drink=coffee*=coffee*=request_drink
       operation=request_drink
    i 1 1*=update_knowledge operation=update_knowledge
    i'd   1   1    drink=coffee*=coffee*=request_drink
       operation=request_drink
    in 1 1*=update_knowledge operation=update_knowledge
    like 3 3
    morning        2         2*=update_knowledge
       operation=update_knowledge
    of   1    1    drink=coffee*=coffee*=request_drink
       operation=request_drink
    please  1   1   drink=coffee*=coffee*=request_drink
       operation=request_drink
    tea   1   1    drink=tea*=tea*=update_knowledge
       operation=update_knowledge
    the            2         2*=update_knowledge
       operation=update_knowledge
```

Step 4

S→X21:X21 like X23:X23 X24:X24 X25:X25 morning (10, 1) {drink=$X23.drink operation=$X21.operation}

S→X21:X21 like tea X24:X24 X25:X25 morning (20,1) {drink=tea operation=$X21.operation}

S→i'd like a cup of X23:X23 please (5,1) {drink=$X23.drink operation=request_drink}

X21→i (30,2) {operation=update_knowledge}

X23→coffee (15,2) {drink=coffee}

X24→in (30,2) {operation=update_knowledge}

X25→the (30 2) {operation=update_knowledge}

Slots are
   X21 2 2*=update_knowledge operation=update_knowledge
   X23 2 2 drink=coffee*=coffee
   X24 2 2*=update_knowledge operation=update_knowledge
   X25 2 2*=update_knowledge operation=update_knowledge
   a 1 1 drink=coffee*=coffee*=request_drink operation=request_drink
   coffee 1 1 drink=coffee*=coffee
   cup 1 1 drink=coffee*=coffee*=request_drink operation=request_drink
   i 1 1*=update_knowledge operation=update_knowledge
   i'd 1 1 drink=coffee*=coffee*=request_drink operation=request_drink
   in 1 1*=update_knowledge operation=update_knowledge
   like 3 3
   morning 2 2*=update_knowledge operation=update_knowledge
   of 1 1 drink=coffee*=coffee*=request_drink operation=request_drink
   please 1 1 drink=coffee*=coffee*=request_drink operation=request_drink
   tea 1 1 drink=tea*=tea*=update_knowledge operation=update_knowledge
   the 1 1*=update_knowledge operation=update_knowledge Step 5

S→X21:X21 like X23:X23 X24:X24 X25:X25 X26:X26 10,1) {drink=$X23.drink operation=$X21.operation}

S→X21:X21 like tea X24:X24 X25:X25 X26:X26 20,1) {drink=tea operation=$X21.operation}

S→i'd like a cup of X23:X23 please (5,1) {drink=$X23.drink operation=request_drink}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}
   X21 2 2*=update_knowledge operation=update_knowledge
   X23 2 2 drink=coffee*=coffee
   X24 2 2*=update_knowledge operation=update_knowledge
   X25 2 2*=update_knowledge operation=update_knowledge
   X26 2 2*=update_knowledge operation=update_knowledge
   a 1 1 drink=coffee*=coffee*=request_drink operation=request_drink
   coffee 1 1 drink=coffee*=coffee
   cup 1 1 drink=coffee*=coffee*=request_drink operation=request_drink
   i 1 1*=update_knowledge operation=update_knowledge
   i'd 1 1 drink=coffee*=coffee*=request_drink operation=request_drink
   in 1 1*=update_knowledge operation=update_knowledge
   like 3 3
   morning 1 1*=update_knowledge operation=update_knowledge
   of 1 1 drink=coffee*=coffee*=request_drink operation=request_drink
   please 1 1 drink=coffee*=coffee*=request_drink operation=request_drink
   tea 1 1 drink=tea*=tea*=update_knowledge operation=update_knowledge
   the 1 1*=update_knowledge operation=update_knowledge Step 6

S→X21:X21 like X23:X23 X24:X24 X25:X25 X26:X26 10,1) {drink=$X23.drink operation=$X21.operation}

S→X21:X21 like X27:X27 X24:X24 X25:X25 X26:X26 20,1) {drink=$X27.drink operation=$X21.operation}

S→i'd like a cup of X23:X23 please (5,1) {drink=$X23.drink operation=request_drink}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}
   X21 2 2*=update_knowledge operation=update_knowledge
   X23 2 2 drink=coffee*=coffee
   X24 2 2*=update_knowledge operation=update_knowledge
   X25 2 2*=update_knowledge operation=update_knowledge
   X26 2 2*=update_knowledge operation=update_knowledge
   X27 1 1 drink=tea*=tea*=update_knowledge operation=update_knowledge
   a 1 1 drink=coffee*=coffee*=request_drink operation=request_drink
   coffee 1 1 drink=coffee*=coffee
   cup 1 1 drink=coffee*=coffee*=request_drink operation=request_drink
   i 1 1*=update_knowledge operation=update_knowledge
   i'd 1 1 drink=coffee*=coffee*=request_drink operation=request_drink
   in 1 1*=update_knowledge operation=update_knowledge
   like 3 3
   morning 1 1*=update_knowledge operation=update_knowledge
   of 1 1 drink=coffee*=coffee*=request_drink operation=request_drink
   please 1 1 drink=coffee*=coffee*=request_drink operation=request_drink
   tea 1 1 drink=tea*=tea*=update_knowledge operation=update_knowledge
   the 1 1*=update_knowledge operation=update_knowledge Step 7

S→X21:X21 like X23:X23 X24:X24 X25:X25 X26:X26 (10,1) {drink=$X23.drink operation=$X21.operation}

S→X21:X21 like X27:X27 X24:X24 X25:X25 X26:X26 (20,1) {drink=$X27.drink operation=$X21.operation}

S→X28:X28 like a cup of X23:X23 please (5,1) {drink=$X23.drink operation=$X28.operation}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}

X28→i'd (5,1) {drink=coffee operation=request_drink}
    X21    2    2*=update_knowledge operation=update_knowledge
    X23 2 2 drink=coffee*=coffee
    X24    2    2*=update_knowledge operation=update_knowledge
    X25    2    2*=update_knowledge operation=update_knowledge
    X26    2    2*=update_knowledge operation=update_knowledge
    X27  1  1  drink=tea*=tea*=update_knowledge operation=update_knowledge
    X28  1  1  drink=coffee*=coffee*=request_drink operation=request_drink
    a  1  1  drink=coffee*=coffee*=request_drink operation=request_drink
    coffee 1 1 drink=coffee*=coffee
    cup  1  1  drink=coffee*=coffee*=request_drink operation=request_drink
    i 1 1*=update_knowledge operation=update_knowledge
    i'd  1  1  drink=coffee*=coffee*=request_drink operation=request_drink
    in 1 1*=update_knowledge operation=update_knowledge
    like 3 3
    morning  1  1*=update_knowledge operation=update_knowledge
    of  1  1  drink=coffee*=coffee*=request_drink operation=request_drink
    please  1  1  drink=coffee*=coffee*=request_drink operation=request_drink
    tea  1  1  drink=tea*=tea*=update_knowledge operation=update_knowledge
    the  1  1*=update_knowledge operation=update_knowledge Step 8

S→X21:X21 like X23:X23 X24:X24 X25:X25 X26:X26 (10,1) {drink=$X23.drink operation=$X21.operation}

S→X21:X21 like X27:X27 X24:X24 X25:X25 X26:X26 (20,1) {drink=$X27.drink operation=$X21.operation}

S→X28:X28 like X29:X29 cup of X23:X23 please (5,1) {drink=$X23.drink operation=$X28.operation}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

Slots
    X21    2    2*=update_knowledge operation=update_knowledge
    X23 2 2 drink=coffee*=coffee
    X24    2    2*=update_knowledge operation=update_knowledge
    X25    2    2*=update_knowledge operation=update_knowledge
    X26    2    2*=update_knowledge operation=update_knowledge
    X27  1  1  drink=tea*=tea*=update_knowledge operation=update_knowledge
    X28  1  1  drink=coffee*=coffee*=request_drink operation=request_drink
    X29  1  1  drink=coffee*=coffee*=request_drink operation=request_drink
    a  1  1  drink=coffee*=coffee*=request_drink operation=request_drink
    coffee 1 1 drink=coffee*=coffee
    cup  1  1  drink=coffee*=coffee*=request_drink operation=request_drink
    i 1 1*=update_knowledge operation=update_knowledge
    i'd  1  1  drink=coffee*=coffee*=request_drink operation=request_drink
    in 1 1*=update_knowledge operation=update_knowledge
    like 3 3
    morning  1  1*=update_knowledge operation=update_knowledge
    of  1  1  drink=coffee*=coffee*=request_drink operation=request_drink
    please  1  1  drink=coffee*=coffee*=request_drink operation=request_drink
    tea  1  1  drink=tea*=tea*=update_knowledge operation=update_knowledge
    the  1  1*=update_knowledge operation=update_knowledge Step 9

S→X21:X21 like X23:X23 X24:X24 X25:X25 X26:X26 (10,1) {drink=$X23.drink operation=$X21.operation}

S→X21:X21 like X27:X27 X24:X24 X25:X25 X26:X26 (20,1) {drink=$X27.drink operation=$X21.operation}

S→X28:X28 like X29:X29 X30:X30 of X23:X23 please (5,1) {drink=$X23.drink operation=$X28.operation}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

X30→cup (5,1) {drink=coffee operation=request_drink} all

X21 2 2*=update_knowledge operation=update_knowledge
  X23 2 2 drink=coffee*=coffee
X24 2 2*=update_knowledge operation=update_knowledge
X25 2 2*=update_knowledge operation=update_knowledge
X26 2 2*=update_knowledge operation=update_knowledge
  X27 1 1 drink=tea*=tea*=update_knowledge operation=update_knowledge
  X28 1 1 drink=coffee*=coffee*=request_drink operation=request_drink
  X29 1 1 drink=coffee*=coffee*=request_drink operation=request_drink
  X30 1 1 drink=coffee*=coffee*=request_drink operation=request_drink
  a 1 1 drink=coffee*=coffee*=request_drink operation=request_drink
  coffee 1 1 drink=coffee*=coffee
  cup 1 1 drink=coffee i=coffee*=request_drink operation=request_drink
  i 1 1 *=update_knowledge operation=update_knowledge
  i'd 1 1 drink=coffee*=coffee*=request_drink operation=request_drink
  in 1 1 *=update_knowledge operation=update_knowledge
  like 3 3
  morning 1 1*=update_knowledge operation=update_knowledge
  of 1 1 drink=coffee*=coffee*=request_drink operation=request_drink
  please 1 1 drink=coffee*=coffee*=request_drink operation=request_drink
  tea 1 1 drink=tea*=tea*=update_knowledge operation=update_knowledge
  the 1 1*=update_knowledge operation=update_knowledge Step 10

S→X21:X21 like X23:X23 X24:X24 X25:X25 X26:X26 10,1) {drink=$X23.drink operation=$X21.operation}

S→X21:X21 like X27:X27 X24:X24 X25:X25 X26:X26 20,1) {drink=$X27.drink operation=$X21.operation}

S→X28:X28 like X29:X29 X30:X30 X31:X31 X23:X23 please (5,1) {drink=$X23.drink operation=$X28.operation}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

X30→cup (5,1) {drink=coffee operation=request_drink}

X31→of (5,1) {drink=coffee operation=request_drink}

Slots
all
  X21 2 2*=update_knowledge operation=update_knowledge
  X23 2 2 drink=coffee*=coffee
X24 2 2*=update_knowledge operation=update_knowledge X24 X25 2*=update_knowledge operation=update_knowledge
X25 2 2*=update_knowledge operation=update_knowledge
X26 2 2*=update_knowledge operation=update_knowledge
  X27 1 1 drink=tea*=tea*=update_knowledge operation=update_knowledge
  X28 1 1 drink=coffee*=coffee*=request_drink operation=request_drink
  X29 1 1 drink=coffee*=coffee*=request_drink operation=request_drink
  X30 1 1 drink=coffee*=coffee*=request_drink operation=request_drink
  X31 1 1 drink=coffee*=coffee*=request_drink operation=request_drink
  a 1 1 drink=coffee*=coffee*=request_drink operation=request_drink
  coffee 1 1 drink=coffee*=coffee
  cup 1 1 drink=coffee*=coffee*=request_drink operation=request_drink
  i 1 1 *=update_knowledge operation=update_knowledge
  i'd 1 1 drink=coffee*=coffee*=request_drink operation=request_drink
  in 1 1 *=update_knowledge operation=update_knowledge
  like 3 3
  morning 1 1*=update_knowledge operation=update_knowledge
  of 1 1 drink=coffee*=coffee*=request_drink operation=request_drink
  please 1 1 drink=coffee*=coffee*=request_drink operation=request_drink
  tea 1 1 drink=tea*=tea*=update_knowledge operation=update_knowledge
  the 1 1*=update_knowledge operation=update_knowledge Step 11

S→X21:X21 like X23:X23 X24:X24 X25:X25 X26:X26 10,1) {drink=$X23.drink operation=$X21.operation}

S→X21:X21 like X27:X27 X24:X24 X25:X25 X26:X26 20,1) {drink=$X27.drink operation=$X21.operation}

S→X28:X28 like X29:X29 X30:X30 X31:X31 X23:X23 X32:X32 5,1) {drink=$X23.drink operation=$X28.operation}

X21→i (30,2) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

X30→cup (5,1) {drink=coffee operation=request_drink}

X31→of (5,1) {drink=coffee operation=request_drink}

X32→please (5,1) {drink=coffee operation=request_drink}

This would then complete all of the chunking that is suggested from the monogram table. At this point the bigram table would look as follows:

X21 like 2 2*=update_knowledge operation=update_knowledge operation=$1.operation
X23 X24 1 1 drink=coffee*=coffee*=update_knowledge operation=update_knowledge drink=$1.drink
X23 X32 1 1 drink=coffee*=coffee*=request_drink operation=request_drink drink=$1.drink
X24 X25 2 2*=update_knowledge operation=update_knowledge
X25 X26 2 2*=update_knowledge operation=update_knowledge
X27 X24 1 1 drink=tea*=tea*=update_knowledge operation=update_knowledge drink=$1.drink
X28 like 1 1 drink=coffee*=coffee*=request_drink operation=request_drink operation=$1.operation
X29 X30 1 1 drink=coffee*=coffee*=request_drink operation=request_drink
X30 X31 1 1 drink=coffee*=coffee*=request_drink operation=request_drink
X31 X23 1 1 drink=coffee*=coffee*=request_drink operation=request_drink drink=$2.drink
like X23 1 1 drink=coffee*=coffee*=update_knowledge operation=update_knowledge drink=$2.drink
like X27 1 1 drink=tea*=tea*=update_knowledge operation=update_knowledge drink=$2.drink
like X29 1 1 drink=coffee*=coffee*=request_drink operation=request_drink The bigram table includes fragments of slot specification rules. For instance the bigram X23 X32 includes the fragment drink=$1.drink. This is derived from the rule:

S→X28:X28 like X29:X29 X30:X30 X31:X31 X23:X23 X32:X32 5,1) {drink=$X23.drink operation=$X28.operation}

If there was a conflicting slot specification rule, defined in another production rule, the bigram would be marked as unchunkable and would not be chunked.

Step 12

Based on the bigram table the first bigram rule to be created would be:

X33→X21:X21 like (30,2) {operation=$X21.operation}

Substituting this rule into the grammar would result in

S→X33:X33 X23:X23 X24:X24 X25:X25 X26:X26 10,1) {drink=$X23.drink operation=$X33.operation}

S→X33:X33 X27:X27 X24:X24 X25:X25 X26:X26 20,1) {drink=$X27.drink operation=$X33.operation}

S→X28:X28 like X29:X29 X30:X30 X31:X31 X23:X23 X32:X32 5,1) {drink=$X23.drink operation=$X28.operation}

X21→i (30,1) {operation=update_knowledge}

X23→coffee (15,2) {drink=coffee}

X24→in (30,2) {operation=update_knowledge}

X25→the (30 2) {operation=update_knowledge}

X26→morning (30,2) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

X30→cup (5,1) {drink=coffee operation=request_drink}

X31→of (5,1) {drink=coffee operation=request_drink}

X32→please (5,1) {drink=coffee operation=request_drink}

X33→X21:X21 like (30,2) {operation=$X21.operation}

The bigram table would then become

X21 like 1 1*=update_knowledge operation=update_knowledge operation=$1.operation
X23 X24 1 1 drink=coffee*=coffee*=update_knowledge operation=update_knowledge drink=$1.drink
X23 X32 1 1 drink=coffee*=coffee*=request_drink operation=request_drink drink=$1.drink
X24 X25 2 2*=update_knowledge operation=update_knowledge
X25 X26 2 2*=update_knowledge operation=update_knowledge
X27 X24 1 1 drink=tea*=tea*=update_knowledge operation=update_knowledge drink=$1.drink
X28 like 1 1 drink=coffee*=coffee*=request_drink operation=request_drink operation=$1.operation
X29 X30 1 1 drink=coffee*=coffee*=request_drink operation=request_drink
X30 X31 1 1 drink=coffee*=coffee*=request_drink operation=request_drink
X31 X23 1 1 drink=coffee*=coffee*=request_drink operation=request_drink drink=$2.drink
X33 X23 1 1 drink=coffee*=coffee*=update_knowledge operation=update_knowledge drink=$2.drink operation=$1.operation
X33 X27 1 1 drink=tea*=tea*=update_knowledge operation=update_knowledge drink=$2.drink operation=$1.operation
like X29 1 1 drink=coffee*=coffee*=request_drink operation=request_drink Steps 13 and 14 below show the subsequent step in the chunking phase. As new rules are created the bigram and monogram tables are updated. Although these tables cater for the creation of rules of length one and two respectively rules of longer length can be created from them, due to the fact that a symbol in the bigram table can be expanded into more than one symbol.

Step 13

S→X33:X33 X23:X23 X34:X34 X26:X26 10,1) {drink=$X23.drink operation=$X33.operation}

S→X33:X33 X27:X27 X34:X34 X26:X26 20,1) {drink=$X27.drink operation=$X33.operation}

S→X28:X28 like X29:X29 X30:X30 X31:X31 X23:X23 X32:X32 5,1) {drink=$X23.drink operation=$X28.operation}

X21→i (30,1) {operation=update_knowledge}

X23→coffee (15,2) {drink=coffee}

X24→in (30,1) {operation=update_knowledge}

X25→the (30,1) {operation=update_knowledge}

X26→morning (30,2) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

X30→cup (5,1) {drink=coffee operation=request_drink}

X31→of (5,1) {drink=coffee operation=request_drink}

X32→please (5,1) {drink=coffee operation=request_drink}

X33→X21:X21 like (30,2) {operation=$X21.operation}

X34→X24:X24 X25:X25 (30,2)

The bigram table would then be:

X21 like 1 1*=update_knowledge operation=update_knowledge operation=$1.operation X23 X32 1 1 drink=coffee*=coffee*=request_drink operation=request_drink drink=$1.drink X23 X34 1 1 drink=coffee=coffee*=update_knowledge operation=update_knowledge drink=$1.drink X24 X25 1 1*=update_knowledge operation=update_knowledge operation=$1.operation X27 X34 1 1 drink=tea*=tea*=update_knowledge operation=update_knowledge drink=$1.drink X28 like 1 1 drink=coffee*=coffee*=request_drink operation=request_drink operation=$1.operation X29 X30 1 1 drink=coffee*=coffee*=request_drink operation=request_drink X30 X31 1 1 drink=coffee*=coffee*=request_drink operation=request_drink X31 X23 1 1 drink=coffee*=coffee*=request_drink operation=request_drink drink=$2.drink X33 X23 1 1 drink=coffee*=coffee*=update_knowledge operation=update_knowledge drink=$2.drink operation=$1.operation X33 X27 1 1 drink=tea*=tea*=update_knowledge operation=update_knowledge drink=$2.drink operation=$1.operation X34 X26 2 2*=update_knowledge operation=update_knowledge like X29 1 1 drink=coffee*=coffee*=request_drink operation=request_drink Step 14

S→X33:X33 X23:X23 X35:X35 10,1) {drink=$X23.drink operation=$X33.operation}

S→X33:X33 X27:X27 X35:X35 20,1) {drink=$X27.drink operation=$X33.operation}

S→X28:X28 like X29:X29 X30:X30 X31:X31 X23:X23 X32:X32 5,1) {drink=$X23.drink operation=$X28.operation}

X21→i (30,1) {operation=update_knowledge}

X23→coffee (15,2) {drink=coffee}

X24→in (30,1) {operation=update_knowledge}

X25→the (30,1) {operation=update_knowledge}

X26→morning (30,1) {operation=update_knowledge}

X27→tea (20,1) {drink=tea operation=update_knowledge}

X28→i'd (5,1) {drink=coffee operation=request_drink}

X29→a (5,1) {drink=coffee operation=request_drink}

X30→cup (5,1) {drink=coffee operation=request_drink}

X31→of (5,1) {drink=coffee operation=request_drink}

X32→please (5,1) {drink=coffee operation=request_drink}

X33→X21:X21 like (30,2) {operation=$X21.operation}

X35→X24:X36 X25:X37 X26:X26 (30 2)

Step 15

At this point the grammar is pruned of redundant slot specification rules. This is determined by checking every rule that uses the rule being pruned, and finding out what attributes it uses. For instance if we examine the non-terminal X24 in the grammar above, It is used in the following rule:

X35→X24:X36 X25:X37 X26:X26 (30 2)

This rule makes no reference to the "operation" slot therefore the slot specification rule {operation=update_knowledge} is pruned from the rule.

After the pruning phase which prunes slot specification rules the grammar is

S→X33:X33 X23:X23 X35:X35 10,1) {drink=$X23.drink operation=$X33.operation}

S→X33:X33 X27:X27 X35:X35 20,1) {drink=$X27.drink operation=$X33.operation}

S→X28:X28 like X29:X29 X30:X30 X31:X31 X23:X23 X32:X32 5,1) {drink=$X23.drink operation=$X28.operation}

X21→i (30,1) {operation=update_knowledge}

X23→coffee (15,2) {drink=coffee}

X24→in (30,1)

X25→the (30,1)

X26→morning (30,1)

X27→tea (20,1) {drink=tea operation=update_knowledge}

X28→i'd (5,1) {drink=coffee operation=request_drink}

X29→a (5,1)

X30→cup (5,1)

X31→of (5,1)

X32→please (5,1)

X33→X21:X21 like (30,2) {operation=$X21.operation}

X35→X24:X36 X25:X37 X26:X26 (30 2)

again, after pruning slot specification rules the grammar is

S→X32:X32 X22:X22 X35:X35 10,1) {drink=$X22.drink operation=$X32.operation}

S→X32:X32 X26:X26 X35:X35 20,1) {drink=$X26.drink operation=$X32.operation}

S→X27:X27 like x28:X28 X29:X29 X30:X30 X22:X22 X31:X31 5,1) {drink=$X22.drink operation=$X27.operation}

X21→i (30,1) {operation=update_knowledge}

X22→coffee (15,2) {drink=coffee}

X23→in (30,1)

X24→the (30,1)

X25→morning (30,1)

X26→tea (20,1) {drink=tea}

X27→i'd (5,1) {operation=request_drink}

X28→a (5,1)

X29→cup (5,1)

X30→of (5,1)

X31→please (5,1)

X32→X21:X21 like (30,2) {operation=$X21.operation}

X35→X23:X36 X24:X37 X25:X25 (30,2)

If the rule unity rule is then applied the grammar becomes

Step 16

S→X32:X32 X22:X22 X35:X35 (10,1) {drink=$X22.drink operation=$X32.operation}

S→X32:X32 X26:X26 X35:X35 (20,1) {drink=$X26.drink operation=$X32.operation}

S→X27:X27 like a cup of X22:X22 please (5,1) {drink=$X22.drink operation=$X27.operation}

X21→i (30,1) {operation=update_knowledge}

X22→coffee (15,2) {drink=coffee}

X26→tea (20,1) {drink=tea}

X27→i'd (5,1) {operation=request_drink}

X32→X21:X21 like (30,2) {operation=$X21.operation}

X35→in the morning (30,2)

The merging phase procedure 54, uses a list of rules that are examined for merging evidence patterns. This list is known as the Merge Agenda. At the beginning of the merging phase all rules are added to the Merge Agenda Each rule on the Merge Agenda is examined and processed to determine when there is evidence for effecting a merger. Based on principle (3), a set of evidence patterns is established to determine when merging needs to occur. The four evidence patterns and the required merger action is recited in Table 1 below.

TABLE 1

| Evidence | Action |
| --- | --- |
| X -> A B | Merge B and C |
| X -> A C | X -> A Y |
|  | Y -> B |
|  | Y -> C |
| X -> A B | Merge A and C |
| X -> C B | X -> Y B |
|  | Y -> A |
|  | Y -> C |
| X -> A B C | Merge B and D |
| X -> A D C | X -> A Y C |
|  | Y -> B |
|  | Y -> D |
| X -> A D | Merge A and F E |
| X -> F E D | X -> Y D |
|  | Y -> A |
|  | Y -> F E |
| X -> A B | Merge B and C O |
| X -> A C O | X -> A Y |
|  | Y -> B |
|  | Y -> C O |
| X -> A | Merge A and B, where both are non-terminals |
| X -> B |  |

For all of the actions described in the above table, with the exception of the last action involving deleting the evidence rule, the symbols which are merged may be non-terminals or terminals. For the merge to occur the slot specification rules when expressed in relative form for both rules need to be identical. In addition the terminals to be merged need to return identical types. If a symbol to be merged is a non-terminal, then it is not necessary to create a rule of the form Y→A where only one symbol is on the right hand side. A rule Y→a only needs to be created for terminals involved in the merger. If, for example, all of the symbols to be merged are non-terminals, then the symbols can be replaced on the right hand side and left hand side of the rules of the grammar in which they appear with a reference to a new non-terminal and no additional rules need to be created.

If there is evidence for the merge, the merger is executed, as explained further below. Any redundant rules are deleted and any rules changed as a result of the merging are added to the Merge Agenda. Operation then proceeds to determining whether any rules should remain on the Merge Agenda. If not, a rule is taken off the Merge Agenda. If the last rule has been reached, the procedure ends.

Continuing on from the previous example after the end of the pruning phase 301 the grammar expressed in relative format will be as follows:

S→X32:X32 X22:X22 X35:X35 (10,1) {drink=$2.drink operation=$1.operation}

S→X32:X32 X26:X26 X35:X35 (20,1) {drink=$2.drink operation=$1.operation}

S→X27:X27 like a cup of X22:X22 please (5,1) {drink=$6.drink operation=$1.operation}

X21→i (30,1) {operation=update_knowledge}

X22→coffee (15,2) {drink=coffee}

X26→tea (20,1) {drink=tea}

X27→i'd (5,1) {operation=request_drink}

X32→X21:X21 like (30,2) {operation=$1.operation}

X35→in the morning (30,2)

Using the four different merging patterns listed in Table 1, the grammar is altered as follows:

Step 17 (merge X22 and X26)

S→X32:X32 X38:X26 X35:X35 (30,1) {drink=$2.drink operation=$1.operation}

S→X27:X27 like a cup of X38:X22 please (5,1) {drink=$6.drink operation=$1.operation}

X21→i (30,1) {operation=update_knowledge}

X38→coffee (15,2) {drink=coffee}

X38→tea (20,1) {drink=tea}

X27→i'd (5,1) {operation=request_drink}

X32→X21:X21 like (30,1) {operation=$1.operation}

X35→in the morning (30,1)

Using the doubly linked list structure, only the symbol on the left hand side needs to be changed for all of the rules that use it. In the example given X22 and X26 are non-terminals. If one of the symbols to be merged is a terminal a rule is created with that symbol on the right hand side.

Principle (4) is satisfied by the chunking and merge procedures 52 and 54 adjusting the hyperparameters. When a rule for a phrase is added, the hyperparameter of a rule is equal to the sum of the hyperparameters of the two rules that use it. When a phrase rule is added that uses an existing rule, the hyperparameter of the existing rule is increased by the hyperparameter of the new rule. When two rules are merged, the hyperparameter of the newly formed rule is the sum of the two previous hyperparameters.

Once the model merging process is completed principle (2) can be applied to rules that have slot specification rules and rule counts of one. If this is done to the previous example the grammar in absolute mode becomes S→I like x38:x26 in the morning (30,1) {drink=$X26.drink operation=update_knowledge}

S→i'd like a cup of X38:X22 please (5,1) {drink=$X22.drink operation=request_drink}

X38→coffee (15,2) {drink=coffee}

X38→tea (20,1) {drink=tea}

The grammar can then be made more human readable by performing the following:

(i) Removing all variables that are not referenced.

(ii) Non-terminals are assigned names that reflect the slots they return.

(iii) Non-terminals that do not return a value, but reflect synonyms are renamed.

For instance

X23 the (1,2)

X23 a (1,1)

Can be renamed

The (1,2)

The a (1,1)

Variables can also be assigned lower case names with small numbers. Using this technique the grammar becomes S→I like Drink:x1 in the morning (30,1) {drink=$x1.drink operation=update_knowledge}

S→i'd like a cup of Drink:x1 please (5,1) {drink=$x1.drink operation=request_drink}

Drink→coffee (15,2) {drink=coffee}

Drink→tea (20,1) {drink=tea}

After the model merging procedure is completed the probabilities of the rules can be calculated S→I like Drink:x1 in the morning (30,1) {drink=$x1.drink operation=update_knowledge}--prob=(30/35)

S→i'd like a cup of Drink:x1 please (5,1) {drink=$x1.drink operation=request_drink}--prob=(5/35)

Drink→coffee (15,2) {drink=coffee}--prob=(15/35)

Drink→tea (20,1) {drink=tea}--prob=(20/35)

It can be seen that the new grammar is more general than the observations. For instance it can generate the phrase i'd like a cup of tea please According to the inferred grammar the meaning of this phrase is determined to be operation=request_drink drink=tea The probability of this phrase is calculated to be 5/35*20/35~0.08.

Merging nearly always reduces the number of rules as whenever a merge is identified either two rules are merged or one is deleted. When two rules are merged, one rule is deleted and the hyperparameter of one is increased by the hyperparameter of the deleted rule.

In order to operate well, the model merging procedure 50 uses as a data structure to ensure the following operations are executed with efficiency:

(a) Appending a symbol to a rule.

(b) Merging rules.

In the data structure:

(i) Each word is replaced by a single integer representing the word.

(ii) Each symbol is represented by a structure that contains a symbol identification (id) number, plus a pointer to the previous and subsequent symbol in a rule. Each rule has guard symbol Ω which points to both the first and the last symbols in the rule. This implements the doubly linked list.

(iii) Each rule is attached to a structure representing a non-terminal.

Figure 7:
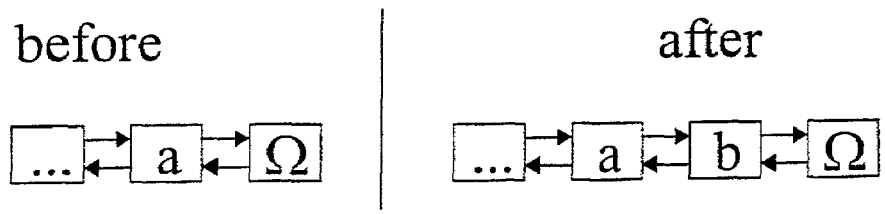
FIG. 7 is a schematic diagram illustrating appending a grammar symbol.

The data structure and its use is illustrated in FIG. 7 which show how the data structure changes for appending a symbol.

All non-terminals are referenced in two global associative arrays, which associates the non-terminal id with the non-terminal. The first array is known as the rule array, and contains all of the rules attached to a given non-terminal. The second is known as the monogram table and contains references to all of the occurrences of that non-terminal on the right hand sides of rules. If states A and B are to be merged, then all non-terminal structures referenced in the rule array are accessed and the non-terminal id on each of these is changed. Occurrences of the merged symbols on the right hand side are modified by iterating through all references contained in the monogram table. To enable merges to be rolled back, copies are made of monogram table entries, and rule array entries prior to a merge. The merge is then performed and tests for problems such as recursion or added ambiguity are then undertaken. If these tests suggest that a merge should not occur then the merge is rolled back. All relevant associative arrays and hash tables are then updated.

Figure 8:
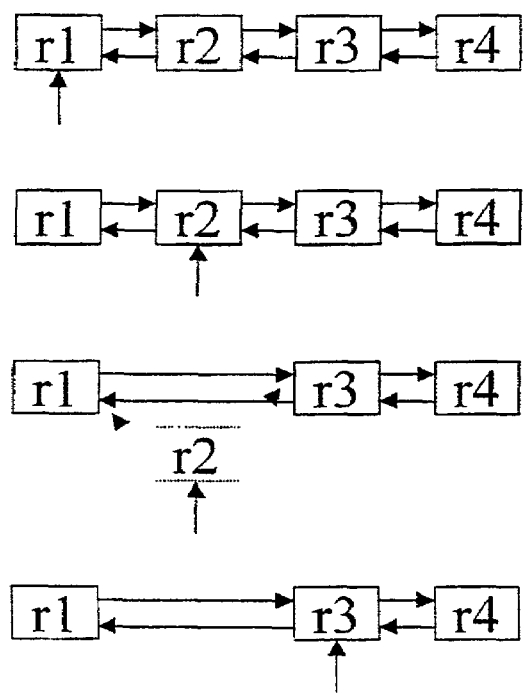
FIG. 8 is a schematic diagram illustrating processing of rules using a pointer iterator.

During the merging phase a set of rules known as the merge agenda exists which contains all of the rules that should be examined for merging evidence. At the end of the chunking phase all rules are added to the merge agenda. They are removed from the list, either prior to being examined or when the rule is deleted. Rules are added to the merge agenda when they change, usually due to the merging of two non-terminals. The list of rules are iterated through, by the use of a pointing iterator, as shown in FIG. 8. The rules are iterated through in a re-entrant fashion. In this context re-entrant means that a rule could be deleted, and the remaining rules could be iterated through without affect. This is achieved by storing the rules in the global doubly linked list format. As shown in FIG. 8, initially the iterator points to rule 1, and then subsequently is incremented to point to rule 2. Then if rule 2 is to be deleted, prior to deletion of the rule, the rule is removed from the doubly linked list, and then the iterator is incremented to point to rule 3.

The model merging process 50 is able to infer grammars of arbitrary complexity for categorical data. It achieves this by assuming that the results of slot specification rules are visible on the end result. The inferred slot specification rules only have assignment operators, i.e. product=isdn or product=$x.product. This technique can be extended to both structured data and integers. Structured data can be included by considering the members of a structure as separate slots. For instance consider the structure date, with four members, {year, month, day_of_month, and day_of week}. If during the model merging technique these are represented as four separate slots eg {date.year, date.month, date.day_of_month, date.day_of week} then the model merging process need not be modified.

Numerical data such as integers and floating point numbers can likewise be converted to categorical data. A more useful technique however is to use a predefined grammar for numbers, which can be included, for instance during the templating process. Such a grammar is defined in Appendix 9 for example. To accommodate this grammar the grammar defined in Appendix 10 can be extended to include mathematical operators, such as addition, subtraction, multiplication and division. During the incorporation phase of model merging, any observations that can be parsed by this grammar will be, and generalisation can continue on those other parts of the grammar. To do this however the rules of the predefined grammar need to be denoted as fixed. In the grammar format used in this document this is noted through the use of the exclamation at the beginning of the rule. Rules that are fixed cannot be altered in any way. To accommodate fixed rules the following modifications are required.

If a non-terminal has any fixed rules, then that non-terminal cannot be merged with any other non-terminal.

Fixed rules cannot be deleted, nor can their probability be set to zero. To prevent this occurring, during the reestimation phase all fixed rules have an additional count of 1 added to the count obtained by parsing the examples.

Fixed rules cannot be chunked. If the RHS of a new rule is contained in a fixed rule, it will be substituted. In addition the rule counts using during the chunking phase will not include fixed rules.

Another important feature of the model merging procedure 50 is where the generated grammar cannot be recursive.

Figure 9:
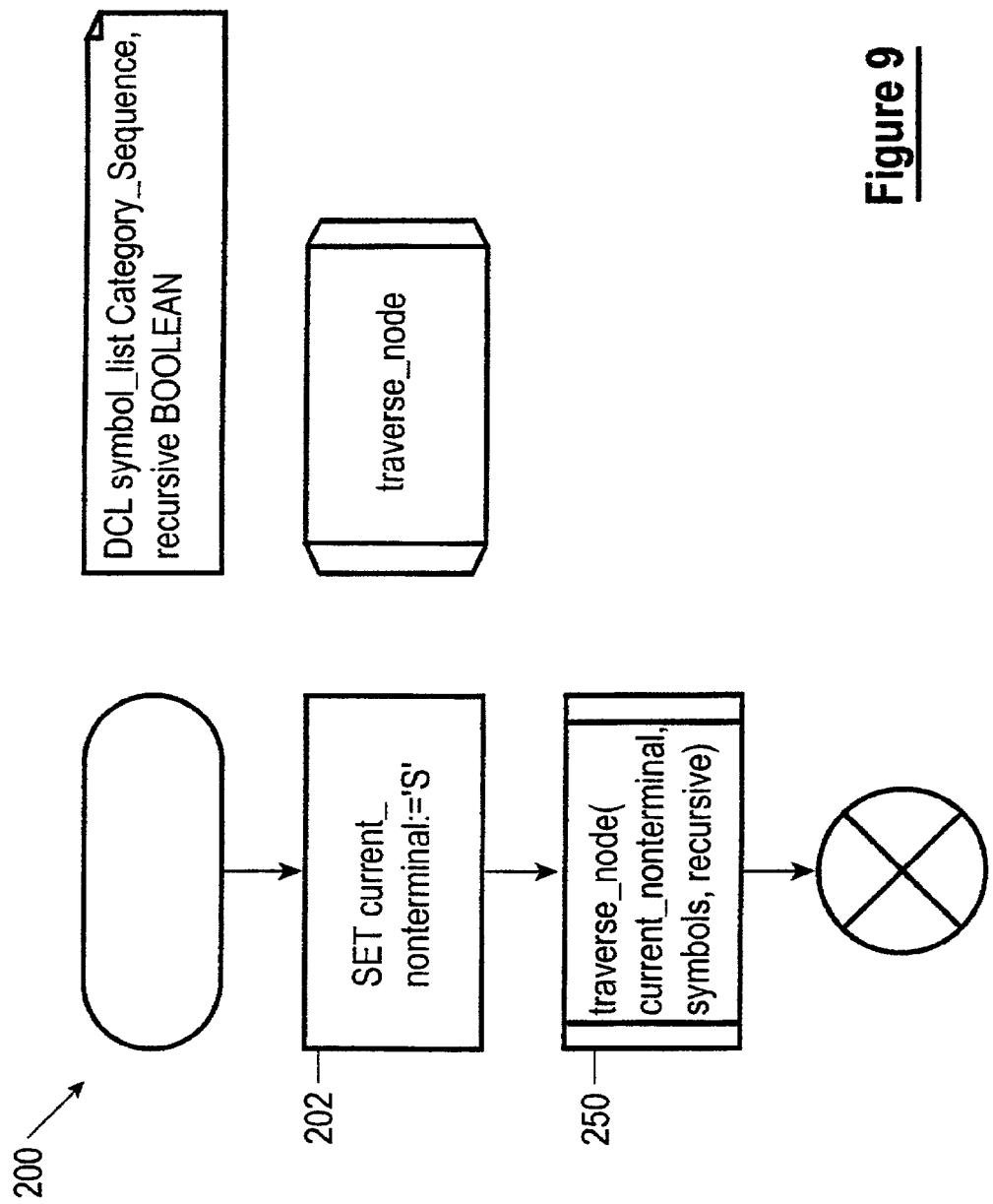
FIG. 9 is a flow diagram of a recurrence procedure.
Figure 10:
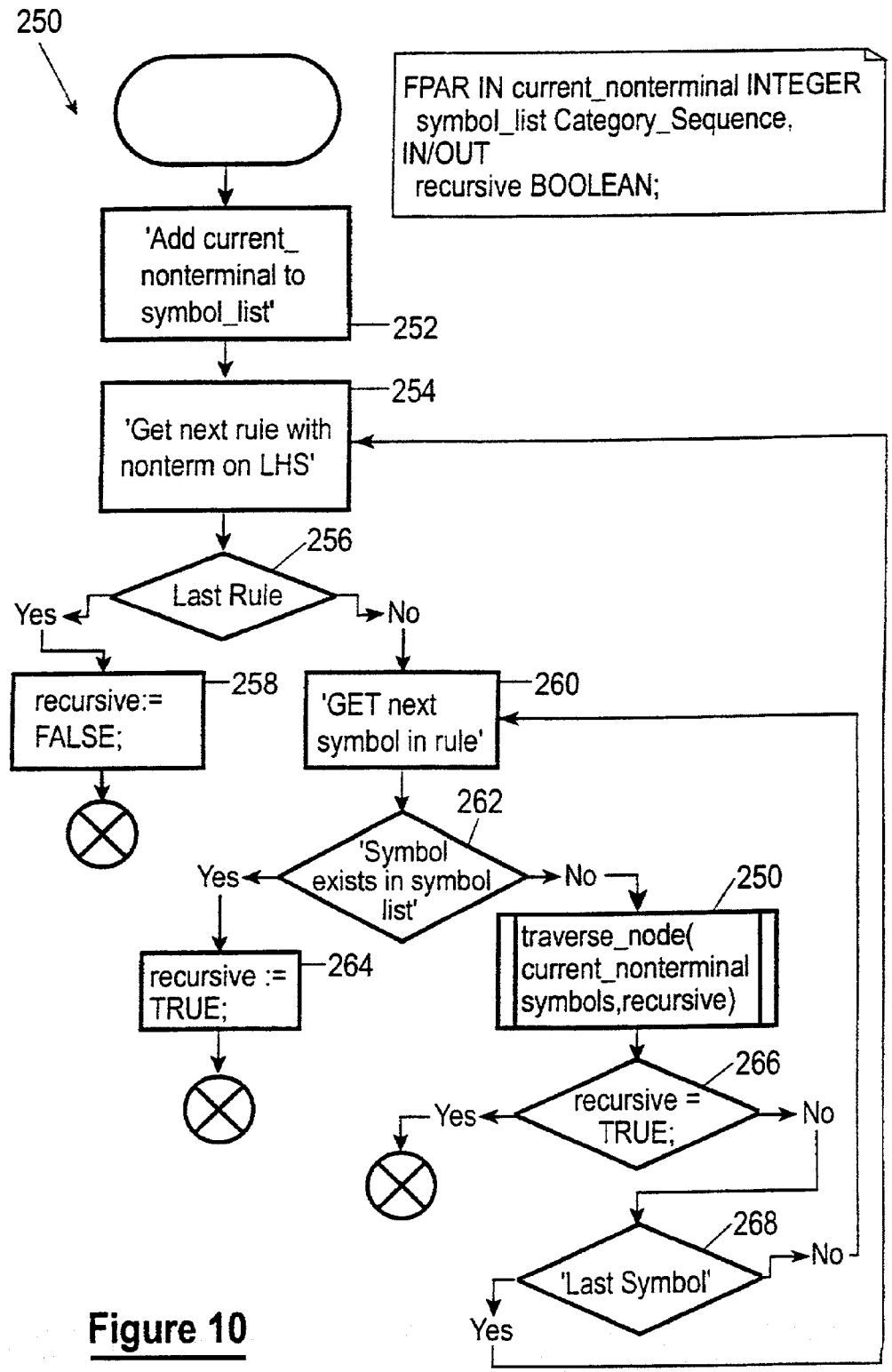
FIG. 10 is a flow diagram of a traverse node procedure.

During the merging phase 54 the merge is tested to see if it generates a recursive grammar. If it does the merge is reversed. Grammar can be tested for recursion using a number of techniques. A preferred method involves execution of a recursive procedure 200, as shown in FIG. 9 which sets a variable current non-terminal to be the top-level grammar at step 202 and then calls a traverse node procedure 250, as shown in FIG. 10, which initially operates on an empty list of non-terminals. The procedure 250 is used recursively to test all of the rules in the grammar that have a particular non-terminal on the left hand side of a rule. A list of non-terminals that have been previously checked is passed to the procedure 250 when subsequently called. The current non-terminal is added to the list of previously tested rules at step 252 and at step 254 the next rule with the current non-terminal on the left hand side is accessed. A test is then executed at step 256 to determine if the last rule has been reached. If yes then a variable recursive is set to false at step 258 and the procedure completes. Otherwise if the last rule has not been reached then the next symbol in the rule is retrieved at step 260, and a determination made to see whether the symbol exists in the symbol list, i.e. if a non-terminal appearing on the right hand side already exists in the list of previously tested non-terminals. If so, the variable recursive is set to true at step 264 and the procedure completes. If not, another instance of the procedure 250 is executed on the non-terminal. When an instance of the procedure 250 generated in this manner completes a test is made at step 266 to determine if the variable recursive is true. If so, the procedure completes, otherwise a test is then made to determine whether the last symbol in the non-terminal list has been reached at step 268. If not, operation returns to step 260, otherwise operation will return to step 254 to retrieve the next rule.

To illustrate how the procedures 200 and 250 operate, Table 2 below sets out the sequence of the rules examined and the compilation of the non-terminal list for the following grammar:

S→a X1 b
S→d e
X1→a X2 b
X1→a S b
X2→i

TABLE 2

| | Rule Being Examined | Non-Terminal List |
|---|---|---|
| (i) | S -> a X1 B | S |
| (ii) | X1 -> a X2 b | S,X1 |
| (iii) | X2 -> i | S,X1,X2 |
| (iv) | X1 -> a S b | S,X1 Grammar is recursive |

The table shows that the top-level grammar S is checked first. When checking the first rule, the non-terminal list contains only the symbol S, and when the symbol X1 is checked in the first rule, the procedure 250 is called recursively to check if any of the rules attached to X1 are recursive, and the symbol X1 is added to the list. The symbol X2 is encountered and also added to the list. When the symbol S is encountered in the right hand side of the second rule for X1. the procedure 250 identifies at step 262 that this symbol already exists in the list, and the grammar is then identified as recursive and the procedure completes. When a test is executed to determine whether a grammar is recursive, and the grammar is known not to be recursive prior to executing a merge, the test for recursion can start with the newly merged non-terminal rather than the top-level grammar. This will reduce execution time when the newly merged non-terminal is not a top-level non-terminal.

During the merging phase a test is undertaken to ensure the possibility of introducing ambiguity as a result of merging two symbols is reduced. If the merging of two symbols causes two rules to exist with the same syntax but with differing slot specification rules, where the slot specification rules of the form X=Y, then the merge is rolled back. For instance:

X1→Y:x1 Z:x2 (2,1) {op=a x=$x1.X y=$x2.Y}
X1→Y:X1 Z:X2 (1,2) {op=a x=$x1.X y=$x1.Y} is acceptable, but

X1→Y:x1 Z (1,1) {op=a X=Y Y=$X2.Y}
X1→Y:x1 Z (1,1) {op=a X=Z Y=$X2.Y} is not acceptable.

All of the processes and components of the development system 40 are preferably executed by a computer program or programs. Alternatively the processes and components may be at least in part implemented by hardware circuits, such as by ASICs. The components may also be distributed or located in one location.

Many modifications will be apparent to those skilled in the art without departing from the scope of the present invention as herein described with reference to the accompanying drawings.

The invention claimed is:

1. A method of developing an interactive system performed by a computer system having data processing logic and computer readable storage media with one or more computer programs stored thereon, comprising using the computer system to:
   receive an application file including application data representative of an application for said system, said application data including operations and input and return parameters, with parameter types, for said application;
   generate a dialogue state machine, including a number of procedures with variables, on the basis of said application data, said state machine including slots for each operation and each input parameter, said slots defining data on which said interactive system executes the operations;
   generate prompts on the basis of said application data including a prompt listing said operations;
   generate grammar on the basis of said application data, said grammar including slots for each operation and input parameters to return data of said parameter types to said state machine; and
   execute grammatical inference to enhance the grammar on the basis of observations recorded by said system, including executing a model merging process that includes:
      processing rules of the grammar;
      creating additional rules representative of repeated phrases; and
      merging equivalent symbols of the grammar;

wherein said rules define said slots and include said symbols.

2. A method as claimed in claim 1, wherein said prompts and grammar are generated on the basis of a predetermined pattern or structure for said prompts and grammar.

3. A method as claimed in claim 2 wherein said grammar includes predefined grammar.

4. A method as claimed in claim 3, wherein said slots include value data representing the meaning of phrase or term of a slot.

5. A method as claimed in claim 1, wherein said rules include slot specification rules including key value data representing the meaning of a phrase or term for a slot.

6. A method as claimed in claim 5, wherein said grammar is hierarchical and said rules include terminal and/or non-terminal symbols, whereby said rules refer to lower level rules to resolve non-terminal symbols.

7. A method as claimed in claim 1, wherein said grammar is hierarchical and said rules include terminal and/or non-terminal symbols, whereby said rules refer to lower level rules to resolve non-terminal symbols.

8. A method as claimed in claim 7, wherein said rule creating step includes generating a non-terminal symbol rule from correlated symbols and slot specification rules.

9. A method as claimed in claim 8, wherein said merging step includes identifying interchangeable symbols on the basis of predetermined merging evidence patterns.

10. A method as claimed in claim 9, wherein said merging step includes determining whether symbols to be merged have compatible slot specification rules and return corresponding slots.

11. A method as claimed in claim 10, wherein said rules include a hyperparameter representing use of the rule in observations parsed during said grammatical inference.

12. A method as claimed in claim 11, wherein said evidence patterns represent relationships between rules indicating a merger and corresponding rule formats to be generated when one of said relationships exist between said rules.

13. A method as claimed in claim 12, wherein said rules include a reference count representing the number of other rules that reference the rule.

14. A method as claimed in claim 1, wherein said rules include a reference count representing the number of other rules that reference the rule.

15. A method as claimed in claim 14, wherein said additional rules are determined on the basis of attribute constraints representing a correlation between slots of a rule and slots of said observations during said creating step.

16. A method as claimed in claim 1, wherein said additional rules are determined on the basis of attribute constraints representing a correlation between slots of a rule and slots of said observations during said creating step.

17. A development tool for an interactive system having code, stored on a computer readable media, for executing the steps of the method as claimed in claim 1.

18. An interactive system developed using the method as claimed in claim 1.

19. A method as claimed in claim 1, wherein said creating step is performed on the basis of observations recorded by said system.

20. A grammatical inference method for developing grammar performed by a computer system having data processing logic and computer readable storage media with one or more computer programs stored thereon, including using the computer system to process rules of the grammar, create additional rules representative of repeated phrases, and merge equivalent symbols of the grammar, wherein said rules define slots to represent data on which an interactive system executes operations and include symbols representing at least a phrase or term.

21. A method as claimed in claim 20, wherein said rules include slot specification rules including key value data representing the meaning of a phrase or term for a slot.

22. A method as claimed in claim 21, wherein said grammar is hierarchical and said rules include terminal and/or non-terminal symbols, whereby said rules refer to lower level rules to resolve non-terminal symbols.

23. A method as claimed in claim 20, wherein said grammar is hierarchical and said rules include terminal and/or non-terminal symbols, whereby said rules refer to lower level rules to resolve non-terminal symbols.

24. A method as claimed in claim 23, wherein said rule creating step includes generating a non-terminal symbol rule from correlated symbols and slot specification rules.

25. A method as claimed in claim 23, wherein said merging step includes identifying interchangeable symbols on the basis of predetermined merging evidence patterns.

26. A method as claimed in claim 25, wherein said merging step includes determining whether symbols to be merged have compatible slot specification rules and return corresponding slots.

27. A method as claimed in claim 25, wherein said evidence patterns represent relationships between rules indicating a merger and corresponding rule formats to be generated when one of said relationships exist between said rules.

28. A method as claimed in claim 23, wherein said rules include a hyperparameter representing use of the rule in observations parsed during said grammatical inference.

29. A method as claimed in claim 20, wherein said rules include a reference count representing the number of other rules that reference the rule.

30. A method as claimed in claim 20, wherein said additional rules are determined on the basis of attribute constraints representing a correlation between slots of a rule and slots of said observations during said creating step.

31. A development tool for an interactive system having code stored on a computer readable media for executing the steps of the method as claimed in claim 20.

32. An interactive system developed using the method as claimed in claim 20.

33. A system for developing an interactive system, comprising:

computer readable storage media;

means for inputting an application file including application data representative of an application for said system and storing the application data in the computer readable storage media, said application data including operations and input and return parameters, with parameter types, for said application;

means for generating a dialogue state machine, including a number of procedures with variables, on the basis of said application data, said state machine including slots for each operation and each input parameter, said slots defining data on which said interactive system executes the operations;

means for generating prompts on the basis of said application data including a prompt listing said operations;

means for generating grammar on the basis of said application data, said grammar including slots for each operation and input parameters to return data of said parameter types to said state machine; and means for executing grammatical inference to enhance the grammar on the basis of observations recorded by said system, including means for executing a model merging process that includes:
processing rules of the grammar;
creating additional rules representative of repeated phrases; and
merging equivalent symbols of the grammar;
wherein said rules define said slots and include said symbols.

34. A development tool for an interactive system, stored on a computer readable media, comprising:
code for inputting an application file including application data representative of an application for said system, said application data including operations and input and return parameters, with parameter types, for said application;
code for generating a dialogue state machine, including a number of procedures with variables, on the basis of said application data, said state machine including slots for each operation and each input parameter, said slots defining data on which said interactive system executes the operations;
code for generating prompts on the basis of said application data including a prompt listing said operations;
code for generating grammar on the basis of said application data, said grammar including slots for each operation and input parameters to return data of said parameter types to said state machine; and
code for executing grammatical inference to enhance the grammar on the basis of observations recorded by said system, including code for executing a model merging process that includes:
processing rules of the grammar;
creating additional rules representative of repeated phrases; and
merging equivalent symbols of the grammar;
wherein said rules define said slots and include said symbols.

* * * * *